(12) United States Patent
Giri et al.

(10) Patent No.: US 12,014,748 B1
(45) Date of Patent: Jun. 18, 2024

(54) SPEECH ENHANCEMENT MACHINE LEARNING MODEL FOR ESTIMATION OF REVERBERATION IN A MULTI-TASK LEARNING FRAMEWORK

(71) Applicant: Amazon Technologies, Inc., Seattle, WA (US)

(72) Inventors: Ritwik Giri, Sunnyvale, CA (US); Mehmet Umut Isik, Menlo Park, CA (US); Neerad Dilip Phansalkar, Half Moon Bay, CA (US); Jean-Marc Valin, Montreal (CA); Karim Helwani, Mountain View, CA (US); Arvindh Krishnaswamy, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 336 days.

(21) Appl. No.: 16/988,423

(22) Filed: Aug. 7, 2020

(51) Int. Cl.
 *G10L 21/0208* (2013.01)
 *G06N 5/04* (2023.01)
 *G06N 20/00* (2019.01)
 *G10L 21/034* (2013.01)

(52) U.S. Cl.
 CPC ............ *G10L 21/0208* (2013.01); *G06N 5/04* (2013.01); *G06N 20/00* (2019.01); *G10L 21/034* (2013.01); *G10L 2021/02082* (2013.01)

(58) Field of Classification Search
 CPC .............. G10L 21/0208; G10L 21/034; G10L 2021/02082; G06N 20/00; G06N 5/04
 See application file for complete search history.

(56) References Cited

U.S. PATENT DOCUMENTS

| | | | |
|---|---|---|---|
| 10,511,908 B1 * | 12/2019 | Fisher | G10L 21/0232 |
| 10,602,270 B1 * | 3/2020 | Sørensen | G10L 21/0208 |
| 10,721,521 B1 * | 7/2020 | Robinson | G06F 3/011 |
| 11,012,804 B1 * | 5/2021 | Donley | H04S 7/306 |

(Continued)

OTHER PUBLICATIONS

Choi, Hyeong-Seok, Hoon Heo, Jie Hwan Lee, and Kyogu Lee, "Phase-aware Single-stage Speech Denoising and Dereverberation with U-Net", Jun. 2020, arXiv:2006.00687. (Year: 2020).*

(Continued)

*Primary Examiner* — Daniel C Washburn
*Assistant Examiner* — James Boggs
(74) *Attorney, Agent, or Firm* — NICHOLSON DE VOS WEBSTER & ELLIOTT LLP

(57) ABSTRACT

Techniques for training and using a machine learning model for estimation of reverberation in a multi-task learning framework are described. According to some embodiments, the multi-task learning framework improves the performance of the machine learning model by estimating the amount of reverberation present in an input audio recording as a secondary task to the primary task of generating a clean speech portion of the input audio recording. In one embodiment, a model architecture is selected that takes a noisy reverberant recording as an input and outputs an estimate of a clean (e.g., de-reverberated) signal, an estimate of noise (e.g., background noise), and an estimate of the reverb only portion, with the secondary task of estimating the reverb only portion acting as a regularizer that improves the machine learning model's performance in enhancing the reverberant (e.g., and noisy) input speech.

19 Claims, 11 Drawing Sheets

(56) References Cited

U.S. PATENT DOCUMENTS

| | | | | |
|---|---|---|---|---|
| 11,395,090 | B2* | 7/2022 | Giurda | G10L 21/0264 |
| 11,494,614 | B2* | 11/2022 | Chung | G06N 7/01 |
| 11,514,925 | B2* | 11/2022 | Jin | G10L 25/30 |
| 2019/0318755 | A1* | 10/2019 | Tashev | G10L 21/0232 |
| 2020/0090644 | A1* | 3/2020 | Klingler | G06N 3/006 |
| 2020/0286504 | A1* | 9/2020 | Seetharaman | G10L 21/0232 |
| 2020/0312313 | A1* | 10/2020 | Maddali | H04M 3/5183 |
| 2020/0382895 | A1* | 12/2020 | Schissler | H04S 7/304 |
| 2020/0388297 | A1* | 12/2020 | Rudberg | G10L 25/84 |
| 2021/0035563 | A1* | 2/2021 | Cartwright | G10L 15/16 |
| 2021/0050029 | A1* | 2/2021 | Kleinberger | H04R 3/04 |
| 2021/0224602 | A1* | 7/2021 | Nori | G06N 7/005 |
| 2022/0036178 | A1* | 2/2022 | Dimitriadis | G06N 3/08 |

OTHER PUBLICATIONS

Bryan, Nicholas J. "Impulse Response Data Augmentation and Deep Neural Networks for Blind Room Acoustic Parameter Estimation", May 2020, 2020 IEEE International Conference on Acoustics, Speech and Signal Processing (ICASSP 2020), pp. 396-400. IEEE. (Year: 2020).*

Fan, Cunhang, Jianhua Tao, Bin Liu, Jiangyan Yi, and Zhengqi Wen, "Simultaneous Denoising and Dereverberation Using Deep Embedding Features", Apr. 2020, arXiv:2004.02420. (Year: 2020).*

Li, Chenxing, Tieqiang Wang, Shuang Xu, and Bo Xu, "Single-channel Speech Dereverberation via Generative Adversarial Training", Sep. 2018, Interspeech 2018, pp. 1309-1313. (Year: 2018).*

Williamson, Donald S., and DeLiang Wang, "Speech Dereverberation and Denoising Using Complex Ratio Masks", Mar. 2017, 2017 IEEE International Conference on Acoustics, Speech and Signal Processing (ICASSP 2017), pp. 5590-5594. (Year: 2017).*

Han, Kun, Yuxuan Wang, DeLiang Wang, William S. Woods, Ivo Merks, and Tao Zhang, "Learning Spectral Mapping for Speech Dereverberation and Denoising", Jun. 2015, IEEE/ACM Transactions on Audio, Speech, and Language Processing, vol. 23, No. 6, pp. 982-992. (Year: 2015).*

Wager, Sanna, Keunwoo Choi, and Simon Durand, "Dereverberation Using Joint Estimation of Dry Speech Signal and Acoustic System", Jul. 2020, arXiv:2007.12581. (Year: 2020).*

Hioka, Yusuke, and Kenta Niwa, "Estimating Direct-to-Reverberant Ratio Mapped from Power Spectral Density Using Deep Neural Network", Mar. 2016, 41st IEEE International Conference on Acoustics, Speech and Signal Processing (ICASSP 2016), pp. 26-30. (Year: 2016).*

Zhao, Yan, Zhong-Qiu Wang, and DeLiang Wang, "Two-Stage Deep Learning for Noisy-Reverberant Speech Enhancement", Jan. 2019, IEEE/ACM Transactions on Audio, Speech and Language Processing (TASLP), vol. 27, No. 1, pp. 53-62. (Year: 2019).*

Valentini-Botinhao, Cassia, and Junichi Yamagishi, "Speech Enhancement of Noisy and Reverberant Speech for Text-to-Speech", Aug. 2018, IEEE/ACM Transactions on Audio, Speech and Language Processing (TASLP), vol. 26, No. 8, pp. 1420-1433. (Year: 2018).*

Allen et al., "Image Method for Efficiently Simulating Small-Room Acoustics", Acoustical Society of America, 1979, pp. 943-950.

Germain et al., "Speech Denoising with Deep Feature Losses", Sep. 14, 2018, 6 pages.

Giri et al., "Attention Wave-U-Net for Speech Enhancement", IEEE Workshop on Applications of Signal Processing to Audio and Acoustics, Oct. 20-23, 2019, 5 pages.

Hu et al., "Evaluation of Objective Quality Measures for Speech Enhancement", IEEE Transactions on Audio, Speech, and Language Processing, vol. 16, No. 1, pp. 229-238.

ITU-T, "Subjective Evaluation of Speech Quality with a Crowdsourcing Approach", ITU-T p. 808, 2018, 28 pages.

ITU-T, "Perceptual Evaluation of Speech Quality (PESQ): An objective Method for End-to-End Speech Quality Assessment of Narrow-Band Telephone Networks and Speech Codecs", ITU-T Recommendation p. 862, 2001, 30 pages.

Jeub et al., "A Binaural Room Impulse Response Database for the Evaluation of Dereverberation Algorithms", IEEE, 2009, 5 Pages.

Luo et al., "Conv-TasNet: Surpassing Ideal Time-Frequency Magnitude Masking for Speech Separation", May 15, 2019, pp. 1-12.

MacArtney et al., "Improved Speech Enhancement with the Wave-U-Net", Nov. 27, 2018, 5 pages.

Nagrani et al., "VoxCeleb: a Large-Scale Speaker Identification Dataset", May 30, 2018, 6 pages.

Panayotov et al., "Librispeech: An ASR Corpus Based on Public Domain Audio Books", 2015, 5 pages.

Park et al., "A Fully Convolutional Neural Network for Speech Enhancement", Interspeech, Aug. 20-24, 2017, 5 pages.

Reddy et al., "The Interspeech 2020 Deep Noise Suppression Challenge: Datasets, Subjective Speech Quality and Testing Framework", 2020, 5 pages.

Rethage et al., "A Wavenet for Speech Denoising", Jan. 31, 2018, 11 pages.

Roux et al., "Phasebook and Friends: Leveraging Discrete Representations for Source Separation", Mar. 7, 2019, pp. 1-13.

Tolooshams et al., "Channel-Attention Dense U-Net for Multichannel Speech Enhancement", Jan. 30, 2020, 5 pages.

Valin et al., "A Hybrid DSP/Deep Learning Approach to Real-Time Full-Band Speech Enhancement", May 31, 2018, 5 pages.

Wang et al., "Non-local Neural Networks", Apr. 13, 2018, 10 pages.

Wang et al., "Learning Spectral Mapping for Speech Dereverberation and Denoising", IEEE/ACM Transactions on Audio, Speech, and Language Processing, Jun. 2015, 12 pages.

Weninger et al., "Speech Enhancement with LSTM Recurrent Neural Networks and its Application to Noise-Robust ASR", HAL, Jun. 13, 2015, 10 pages.

Williamson et al., "Complex Ratio Masking for Monaural Speech Separation", IEEE/ACM Transactions on audio, Speech, and Language Processing, vol. 24, No. 3, Mar. 2016, pp. 483-492.

Xia et al., "Speech Enhancement with Weighted Denoising Auto-Encoder", ISCA, 2013, pp. 3444-3448.

Xu et al., "A Regression Approach to Speech Enhancement Based on Deep Neural Networks", IEEE/ACM Transactions on Audio, Speech, and Language Processing, vol. 23, No. 1, Jan. 2015, pp. 7-19.

Zhang et al., "Self-Attention Generative Adversarial Networks", Jun. 14, 2019, 10 pages.

Zhao et al., "Late Reverberation Suppression Using Recurrent Neural Networks With Long Short-Term Memory", IEEE, 2018, pp. 5434-5438.

* cited by examiner

SPEECH ENHANCEMENT MACHINE LEARNING MODEL FOR ESTIMATION OF REVERBERATION IN A MULTI-TASK LEARNING FRAMEWORK

BACKGROUND

Electronic devices, such as audio (e.g., voice) controlled electronic devices, are capable of performing various functions. For instance, an individual may speak a command to a device and, in response, the device may perform various functions and/or a system may cause one or more actions to be performed by another device. Two or more electronic devices may be capable of communicating audio with one another, e.g., communicating sounds captured by each devices' microphone(s) to the other device(s).

BRIEF DESCRIPTION OF DRAWINGS

Various embodiments in accordance with the present disclosure will be described with reference to the drawings, in which.

DETAILED DESCRIPTION

Figure 1:
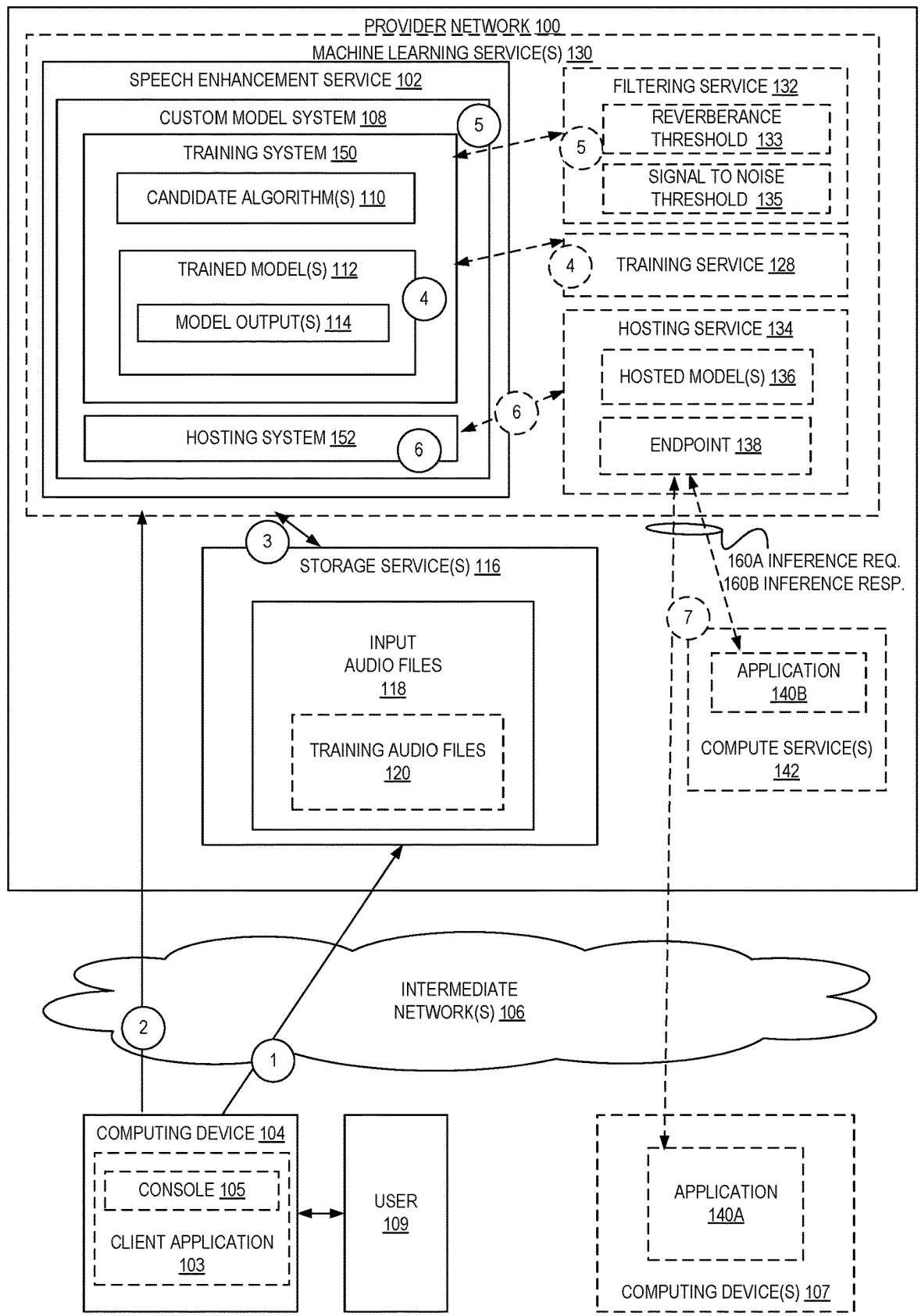
FIG. 1 is a diagram illustrating an environment for creating, training, and using a machine learning model according to some embodiments.

The present disclosure relates to methods, apparatus, systems, and non-transitory computer-readable storage media for creating and utilizing machine learning (ML) models that estimate the amount of reverberation present in an input audio file (e.g., recording). According to some embodiments, a training service trains an algorithm into a ML model that outputs an estimate of a reverb only portion of an input audio file, e.g., along with an estimate of a clean speech portion of the input audio file and/or a noise portion of the input audio file. Embodiments herein include a multi-task learning framework that improves the performance of a speech enhancement system by estimating the amount of reverberation (for example, the sound waves reflected (e.g., many times) from the objects and/or walls of a confined space) present in an input audio file (e.g., recording) as a secondary task, e.g., to the primary task of generating a clean speech portion of the input audio file. Certain embodiments herein utilize the estimated reverberation to characterize the acoustic environment the audio file was recorded in, to estimate reverberation levels, and/or for dataset adaptation (e.g., filtering of a dataset). According to some embodiments, a model architecture (e.g., a convolutional neural network) is selected that takes a noisy reverberant recording as an input and outputs an estimate of a clean (e.g., de-reverberated) signal, an estimate of noise (e.g., background noise), and an estimate of the reverb only portion. In certain embodiment, a (e.g., secondary) task of estimating a reverb only portion acts as a regularizer and improves the ML model's performance in enhancing the reverberant (e.g., and noisy) input speech. In certain embodiments, the reverb only portion and the clean speech portion (e.g., de-reverberated) are used to estimate the direct-to-reverberant ratio (DRR) of the audio file (e.g., recording). For example, using the estimated DRR to characterize the acoustic environment where the recording was made. In one embodiment, a higher value of estimated DRR indicates a not so reverberant acoustic environment (e.g., room) and a lower value indicates a highly reverberant acoustic environment (e.g., room).

An example use case includes dataset adaptation for a speech enhancement task. For example, where the amount of available clean conversational speech data (e.g., used to train a speech enhancement system) is fairly limited, embodiments herein are utilized to filter out audio clips with a (e.g., low) DRR below a threshold value, and scale up the amount of clean training data to train the speech enhancement system.

Embodiments herein provide a (e.g., speech enhancement) ML model that estimates the amount of reverberation present in an input audio file. In certain embodiments, the ML model is robust to the multitude of different speech, recording, and noise conditions present in real-world usage. With an example use being filtering of training data where the available clean speech data for training is limited in the public domain and/or in low signal-to-noise ratio (SNR) cases, e.g., which can be helped by training larger models, which in turn makes the model more prone to fitting to the biases of the available dataset, decreasing robustness to other real-world conditions, and thus making the above challenges more pronounced. As the mismatch between human perception of sound quality and certain standard loss functions and metrics can make well optimized models perform worse in human evaluation, certain embodiments herein solve these problems via a (e.g., speech enhancement) ML model that estimates the amount of reverberation (e.g., reverb only) present in an input audio file.

FIG. 1 is a diagram illustrating an environment for creating, training, and using a machine learning model according to some embodiments. FIG. 1 includes a speech enhancement service 102, one or more storage services 116, one or more machine learning services 130, and one or more compute services 142 implemented within a multi-tenant provider network 100. Each of the speech enhancement service 102, one or more storage services 116, one or more machine learning services 130, and one or more compute services 142 may be implemented via software, hardware, or a combination of both, and may be implemented in a distributed manner using multiple different computing devices.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 142), a storage service 116 that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console 105 implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service (which may be one of compute service(s) 142) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions (e.g., as an application 140B) that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

The speech enhancement service 102, in some embodiments, is a machine learning powered service that estimate the amount of reverberation present in an input audio file (e.g., recording), e.g., as a secondary task to the primary task of generating a clean speech portion of the input audio file. For example, users may use the speech enhancement service 102 to analyze input audio files from a user, e.g., to improve the performance for an individual speaking a command in an input audio file to a device and, in response, the device performing various functions and/or a system causing one or more actions to be performed by another device. For example, users may use the speech enhancement service 102 to analyze input audio files between users, e.g., between two or more electronic devices capable of communicating audio with one another, e.g., communicating sounds in an input audio file captured by each devices' microphone(s) to the other device(s).

In some embodiments, the speech enhancement service 102—via use of a custom model system 108—allows users to build and use model(s) 112 that generate one or more outputs 114. Outputs 114 may include one or more of: a clean speech portion of an input audio file, a reverb only portion of an input audio file, a reverberated speech portion of an input audio file, or a noise portion of an input audio file.

For example, where s is the clean speech audio signal and x=h*s+n (where * is a convolution) is the same signal with added noise (n) and a reverberated speech portion h*s (where s is convolved with a room impulse response h), and ŷ is the estimate of the clean speech portion of the input audio file (e.g., the denoised and/or de-reverberated target signal), in certain embodiments a machine learning (e.g., neural network) model $\mathcal{N}$ takes as input the Fourier transform (e.g., short-time Fourier transform (STFT) of the reverberant and noisy example h*s+n (i.e., "x" above). In one embodiment, the following (with IFTFT being the inverse transform) is used to estimate the complex ratio mask that would give the target signal estimate as:

$$\hat{y} = \text{ISTFT}(\mathcal{N}(\text{STFT})(x)) \cdot \text{STFT}(x)). \quad (1)$$

In certain embodiments, the complex ratio mask is the element-wise ratio (e.g., frequency by frequency ratio) of (i) the Fourier transform (e.g., STFT) for the clean speech portion of the audio file (e.g., "s" above) to (ii) the Fourier transform (e.g., STFT) for the noisy version of the audio file (e.g., "x" above).

In certain embodiments, the estimated reverb only portion of the audio file is the machine learning model's prediction for (h*s−s), e.g., a prediction of h and a prediction of s. In certain embodiments, the estimated clean speech audio signal of the audio file is the machine learning model's prediction for y.

In certain embodiments, the input audio file is converted from an audio waveform domain to a time-frequency domain (e.g., converted by performing a Fourier transform), e.g., so the generating, by the machine learning model, of the reverb portion of the input audio file is in the time-frequency domain. The model output (e.g., reverb portion) of the input audio file may then be converted from the time-frequency domain to the audio waveform domain (e.g., converted by performing an inverse Fourier transform).

The custom model system 108, for example, may enable users to generate model(s) 112 that allow the speech enhancement service 102 to filter out noisy and/or reverberated portions of an audio file, e.g., to generate a clean speech portion of the audio file.

The custom model system 108, for example, may enable users to generate model(s) 112 that allow the speech enhancement service 102 to perform audio enhancement, for example, muting transmission of sound from a microphone when certain conditions are detected (e.g., when a threshold is exceeded by a noise portion of the input audio from the microphone) or generating a clean speech portion of an input audio file for transmittal to a listener (e.g., within an audio calling application).

In certain embodiments, the machine learning techniques include natural-language understanding (NLU) techniques, e.g., NLU machine learning (ML) models. In one embodiment, NLU techniques allow a machine to comprehend text from a human user, for example, to "understand" a request from the human user.

The custom model system 108, for example, may enable users to generate model(s) 112 that allow the speech enhancement service 102 to identify an intent, e.g., specific to the user's domain. A domain may generally refer to a set of computers that are accessed and administered with a common set of rules. The custom model system 108 may obtain, from a user 109, a relatively small set of examples (for example, annotation set(s) in training audio files 120, e.g., that includes a set of utterances mapped to the intents and slots expected as output, which may also include respective confidence scores for the output(s)), and then train a (e.g., NLU) model 112 to recognize similar terms (e.g., in utterances) in any other block of text and provide an expected intent and/or slot names/values, without requiring the user 109 to manage servers, implement particular algorithms, etc.

At a high level, machine learning may include two major components that are required to be put in place in order to expose advertised functionality to the customer: (i) training and (ii) inference. Training may include the following responsibilities: training data analysis; data split (training, evaluating (e.g., development or validation), and testing data); model selection; model training; model evaluation; and status reporting. Inference may include the following responsibilities: model loading and hosting; and inference (e.g., synchronous and batch).

Training may include using a hyperparameter optimization (HPO) pipeline to evaluate a plurality of models and respective configurations. Training may perform a grid search over the matrix of experiments (e.g., defined upfront) in search for the model and its parameters that performs best on the given dataset.

Thus, a user 109 may provide or otherwise identify training audio files 120 for use in creating model(s) 112.

As one example use, as shown at circle (1), the user 109 may utilize a client application 103 executed by a computing device 104 (e.g., a web-application implementing a console 105 for the provider network 100, a standalone application, another web-application of another entity that utilizes the speech enhancement service 102 as a part of its backend, a database or mixed-SQL environment, etc.) to cause the computing device 104 to upload the audio file(s) 118 (e.g., training audio files 120) to a storage location (e.g., provided by a storage service 116 such as an object storage service of a provider network 100). The audio files may be input in audio waveform domain format.

Thereafter, at circle (2) the computing device 104 may issue one or more requests (e.g., API calls) to the speech enhancement service 102 that indicate the user's 109 desire to train a model(s) 112. The request may be of a type that identifies which type of model is to be created, e.g., CreateModel for creating a trained model 112. The request may also include one or more of an identifier of a storage location or locations storing the input audio files 118 (e.g., an identifier of training audio files 120), which may identify a storage location (e.g., via a Uniform Resource Locator (URL), a bucket/folder identifier, etc.) within the provider network 100 (e.g., as offered by a storage service 116) or external to the provider network 100, a format identifier of the input audio files 118 (e.g., training audio files 120), a language identifier of the language of input audio files 118 (e.g., training audio files 120), etc. In some embodiments, the request includes the training audio files 120 within the request.

Responsive to receipt of the request, the custom model system 108 of the speech enhancement service 102 is invoked and begins operations for training the corresponding type of model. For example, the custom model system 108 may identify what type of model is to be trained (e.g., via analyzing the method call associated with the request), the storage location(s) associated with the input audio files 118, etc. Thus, the custom model system 108 may retrieve any stored input audio files 118 (e.g., training audio files 120) as shown at circle (3), which may be from a storage location within the provider network 100 or external to the provider network 100.

In some embodiments, the training (at circle (4)) of the model(s) 112 includes use (at optional, dotted circle (4)) of a separate training service 128 of a machine learning service 130 described later herein to perform a particular training job or hyperparameter optimization tuning job for a model, or the like; the filtering (at circle (5)) of data based at least part on output(s) 114 from model and includes use (at optional, dotted circle (5)) of a separate filtering service 132 of a machine learning service 130 described later herein to perform a particular filtering job (e.g., based on a reverberance threshold 133 and or a signal to noise threshold 135), or the like; similarly, the hosting system 152 of the custom model system 108 may make use (at optional, dotted circle (6)) of a hosting service 134 of a machine learning service 130 to deploy a model as a hosted model 136 in association with an endpoint 138 that can receive inference requests from client applications 140A and/or 140B at circle (7), provide the inference requests 160A to the associated hosted model(s) 136, and provide inference results 160B (e.g., predicted intent, predicted action, etc.) back to applications 140A and/or 140B, which may be executed by one or more computing devices 107 outside of the provider network 100 or by one or more computing devices of a compute service 142 (e.g., hardware virtualization service, serverless code execution service, etc.) within the provider network 100. Candidates algorithm(s) 110 may include the first model architecture depicted in FIG. 3 or the second model architecture depicted in FIG. 6.

Figure 2:
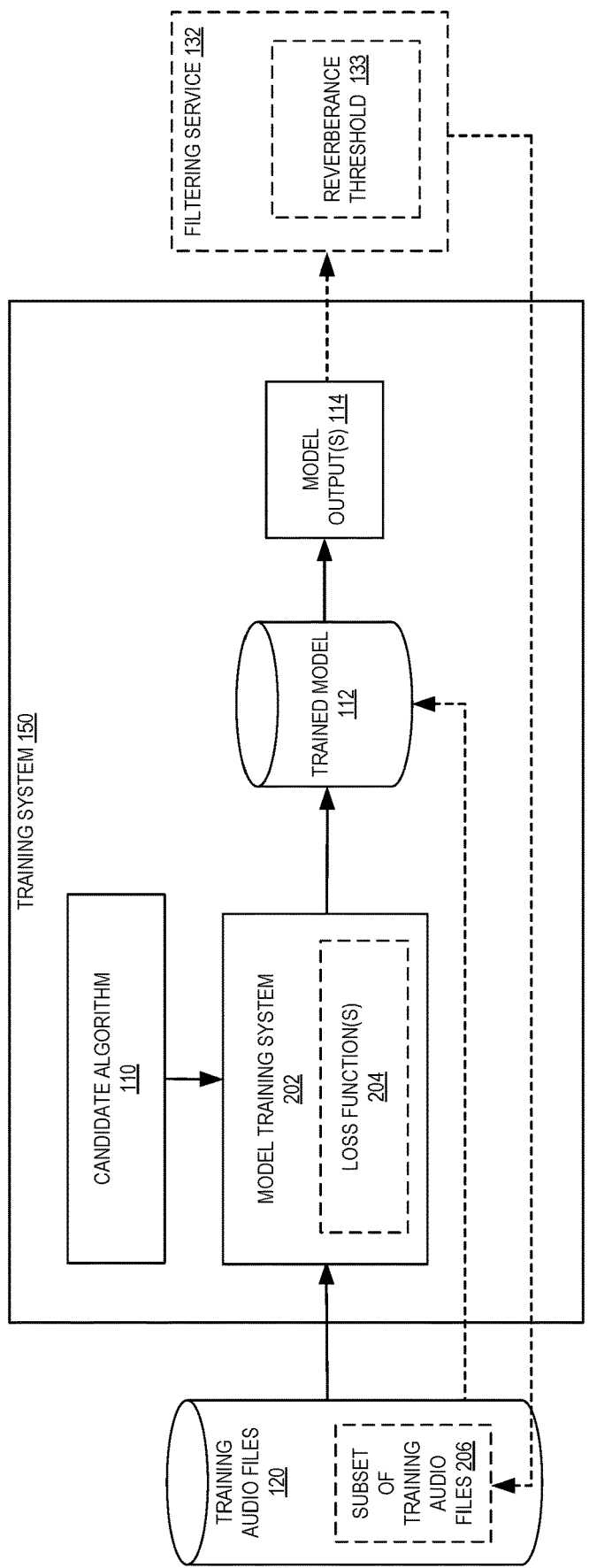
FIG. 2 is a diagram illustrating a training system to train a first model according to some embodiments.

FIG. 2 is a diagram illustrating a training system 150 to train a first model 112 according to some embodiments. Depicted training system 150 includes a model training system 202 to train one or more ML models, for example, to train a ML model to provide model output(s) 114.

In certain embodiments, model training system 202 trains candidate algorithm 110 into a trained model 112. In one embodiment, model training system 202 trains the ML model on a training dataset of audio files 120 (e.g., of audio files 118) (e.g., with a set of hyperparameters of that ML model), evaluates the performance of that model (e.g., at generating one or more outputs 114) on an evaluation portion of training audio files 120 (e.g., by determining a loss value from loss functions(s) 204), and adjusts the (e.g., hyperparameters of that) model (e.g., to minimize a loss value from loss functions(s) 204) to generate a trained model 112. This may be repeated for various hyperparameters and/or model types (e.g., algorithms). When a (e.g., predetermined) threshold score is exceeded by the score for a certain model, the model training system 202 may send that trained model 112 to be used at inference time. In one embodiment, the trained model 112 is a speech enhancement model, e.g., that is trained to output clean speech on an input audio file(s) and a reverb only portion of the input audio file(s). In one embodiment, the trained model 112 is a speech enhancement model that is trained to perform a full de-reverberation on an input audio file(s), e.g., is trained to estimate a reverb only portion (e.g., h*s−s), optionally along with the clean signal s and/or noise n. In certain embodiments, the trained model 112 is used to estimate the direct-to-reverberant ratio (DRR) of each file (e.g., clip) in a set of audio files.

Optionally, filtering service 132 is coupled to model output(s) 114 to perform a filtering based at least in part on the model output(s) 114, e.g., to filter out the file(s) (e.g., clip(s)) that exceed a reverberance threshold 133. In one embodiment, the model outputs 114 include the estimate of the clean speech portion of the input audio file (e.g., y) and the reverb only portion (e.g., h*s−s), e.g., with the filtering service dividing the clean speech portion of the input audio file (e.g., y) by the reverb only portion (e.g., h*s−s) to generate the DRR. In certain embodiments, the DRR is compared to a reverberance threshold 133, e.g., and those file(s) (e.g., clip(s)) of training audio files 120 that exceed a reverberance threshold 133 are removed to create a subset of training audio files 206. In one embodiment, the reverberance threshold 133 is about 20 dB or about 30 dB. This subset of (e.g., cleaned) training audio file(s) 206 may then be used to perform another training iteration of a candidate algorithm, e.g., to create a different trained model 112 (or update the current trained model 112).

Figure 3:
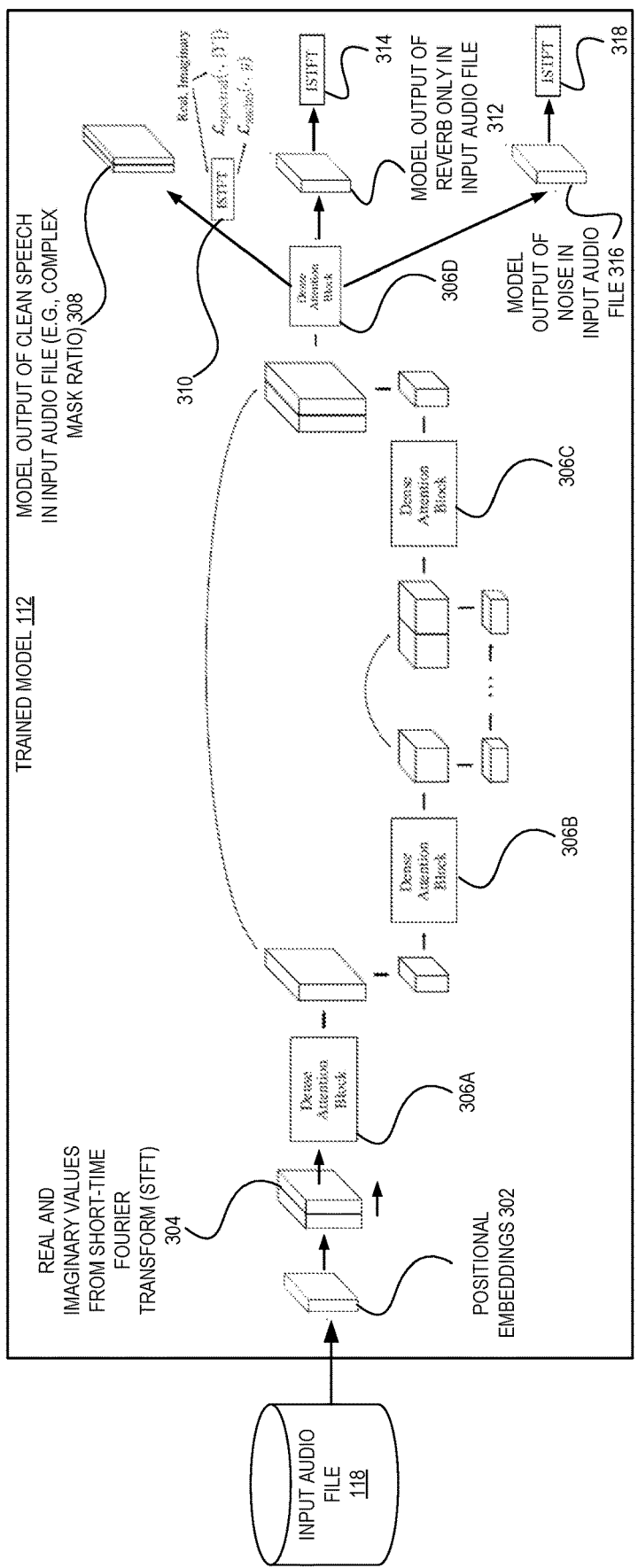
FIG. 3 is a diagram illustrating a model architecture of the first model according to some embodiments.

FIG. 3 is a diagram illustrating a model architecture of the first model 112 according to some embodiments. Depicted model 112 takes as input an audio file 118, and generates one or more model outputs of (i) clean speech portion 308 (e.g., the complex mask ratio) of the input audio file 118, (ii) reverb only portion 312 of the input audio file 118, (iii) noise portion 316 of the input audio file 118, or any combination thereof. In certain embodiments, each output includes its own loss function, for example, a first loss function for clean speech portion 308 (e.g., the complex mask ratio) of the input audio file 118, a second loss function for reverb only portion 312 of the input audio file 118, and a third loss function for noise portion 316 of the input audio file 118.

In one embodiment, for each target y, the loss function (e.g., loss function for clean speech portion 308) is:

$$L(y,\hat{y}) = \lambda_{audio} L_{audio}(y,\hat{y}) + \lambda_{spectral} L_{spectral}(Y,\hat{Y}) \quad (2)$$

and the audio loss is the L1 loss:

$$L_{audio}(y,\hat{y}) = |y - \hat{y}| \quad (3)$$

and for the spectral loss function $\mathcal{L}_{spectral}$, let $Y_{t,f}$=absolute value of $STFT(y)_{t,f}$ and $\hat{Y}_{t,f}$=absolute value of $STFT(\hat{y})_{t,f}$ be the STFT bin magnitudes and set:

$$\mathcal{L}_{spectral} = \sum_{t,f} w(f)\left(\lambda_{over}\mathbb{1}_{\hat{Y} \geq Y, t, f} + \lambda_{under}\mathbb{1}_{\hat{Y} < Y, t, f}\right)|Y_{t,f} - \hat{Y}_{t,f}| \quad (4)$$

Such that w is a frequency-weighting function, and $$\mathbb{1}_{\hat{Y} \geq Y, t, f} \quad (5)$$

is the characteristic function with value 1 if $\hat{Y}_{t,f} > Y_{t,f}$ and value 0 otherwise. Thus, the variables $\lambda_{over}$ and $\lambda_{under}$ bias the model for overestimation or underestimation of the speech magnitude, respectively.

In certain embodiments, model 112 receives an input audio file 118 (e.g., in audio waveform domain format) and generates positional embeddings 302. The positional embeddings 302 may then be converted from a first format (e.g., waveform domain) to a second format of real and imaginary values (e.g., in time-frequency domain) 304, e.g., from short-time Fourier transform (STFT). The real and real and imaginary values (e.g., in time-frequency domain) 304 may then be input into a first dense attention block 306A (e.g., as discussed further in reference to FIG. 4 below), through one or more additional layers of the model 112, and through second dense attention block 306B, third dense attention block 306C, and fourth dense attention block 306D. In one embodiment, input audio file 118 is a single audio clip, e.g., having a duration of about ten seconds.

Although four dense attention blocks are depicted any single or plurality of dense attention blocks may be utilized in certain embodiments. In certain embodiments, straight arrows in model 112 depict convolutions (e.g., with batch normalization and rectified linear activation unit (ReLU) non-linearity) and curved arrows in model 112 depict concatenations. In one embodiment, a rectified linear activation function returns the value provided as input directly if the input is greater than zero, or the value zero if the input is zero or less.

In certain embodiments, depicted model 112 generates one or more model outputs of (i) clean speech portion 308 (e.g., the complex mask ratio) of the input audio file 118, (ii) reverb only portion 312 of the input audio file 118, (iii) noise portion 316 of the input audio file 118, or any combination thereof, and further converts them from a second format (e.g., real and imaginary values in time-frequency domain) to a first format (e.g., waveform domain), e.g., via an inverse transform (e.g., ISTFT) 310, 314, and 318, respectively.

In certain embodiments, the architecture of neural model $\mathcal{N}$ 112 includes fully-convolutional two dimensional (e.g., U-Net) architecture with self-attention layers and four layer dense attention blocks 306A-D at each level. In one embodiment, the convolutions are causal in the time direction, but not in the frequency direction, e.g., such that padding is applied symmetrically in the frequency direction, but applied asymmetrically in the time direction (e.g., in the sense that it is only used at the edge of each layer corresponding to the early part in time). In one embodiment, this helps preserve the output quality at the late portion of the output which is used in low-latency application as padding tends to hurt quality near edges and borders. In certain embodiments, look-ahead is provided by the average-pooling layers, which are used instead of max-pooling.

Figure 4:
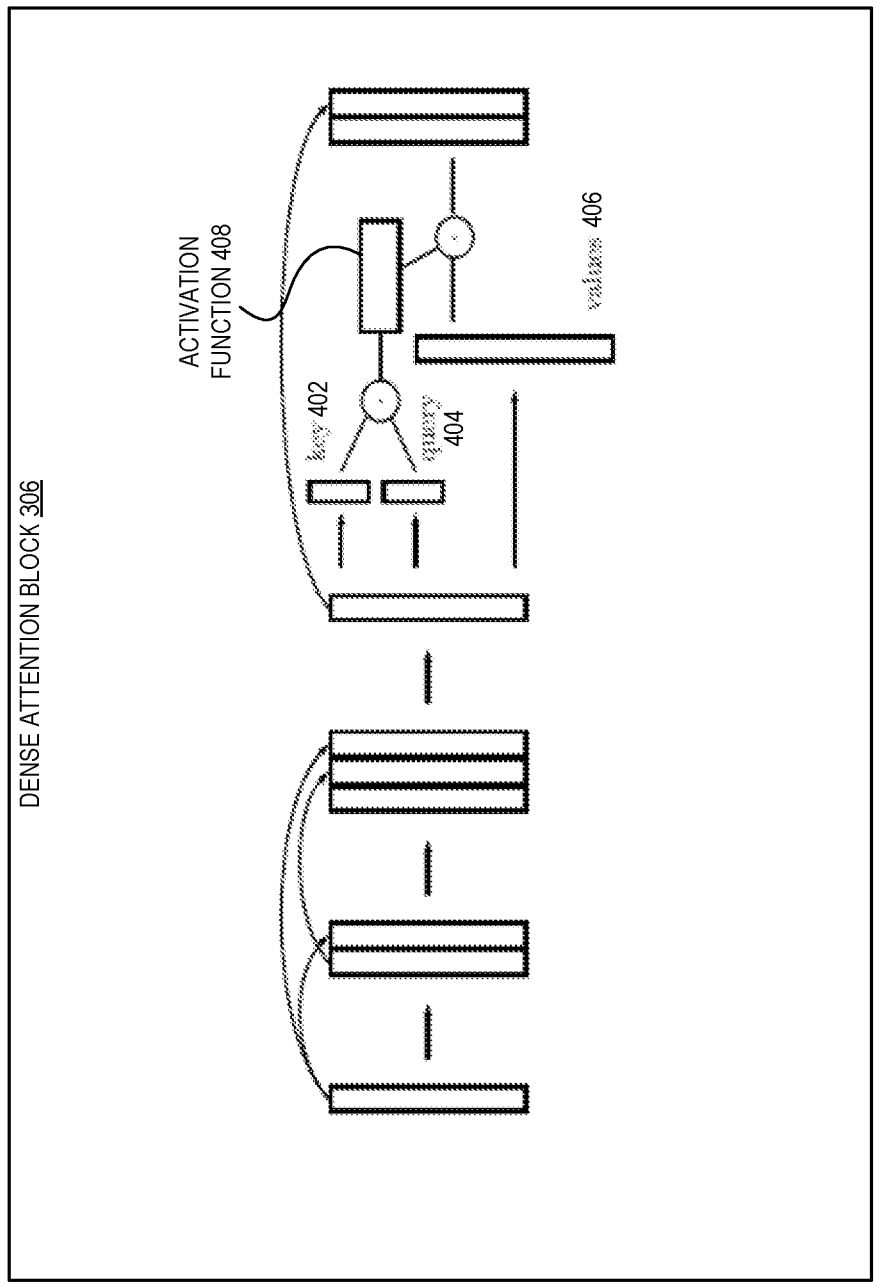
FIG. 4 is a diagram illustrating a dense attention block according to some embodiments.

FIG. 4 is a diagram illustrating a dense attention block 306 (e.g., for each instance of 306A-306D) according to some embodiments. In certain embodiments, straight arrows in dense attention block 306 depict convolutions (e.g., with batch normalization and rectified linear activation unit (ReLU) non-linearity) and curved arrows in dense attention block 306 depict concatenations. Depicted block includes a key 402 and query 404 that are inputs for a dot product operation, and that dot product result is input into activation function 408, e.g., with the results of the activation function 408 input along with the values 406 into dot product operation to generate the output values of the dense attention block 306. In one embodiment, a rectified linear activation function 408 (e.g., a Softmax activation function with cumulative outputs that sum to one) returns the value provided as input directly if the input is greater than zero, or the value zero if the input is zero or less. In one embodiment, the dense attention block 306 aggregates information only in the time direction to increase efficiency during training and inference.

In certain embodiments, the first model discussed above in reference to FIGS. 2 and 3 may accurately estimate DRR, but its clean signal estimates may contain artifacts such that they are not suitable for training use. Instead, certain embodiments herein use a second model (e.g., with the same architecture), trained to estimate (e.g., only) a reverberated speech portion (e.g., h*s) and a noise portion (n) of an input audio file. Embodiments herein utilize this denoise-only model to filter out all clips with signal-to-noise ratio (SNR) less than a threshold (e.g., about 10 dB), and use its clean speech estimates as training data for subsequent operations.

Figure 5:
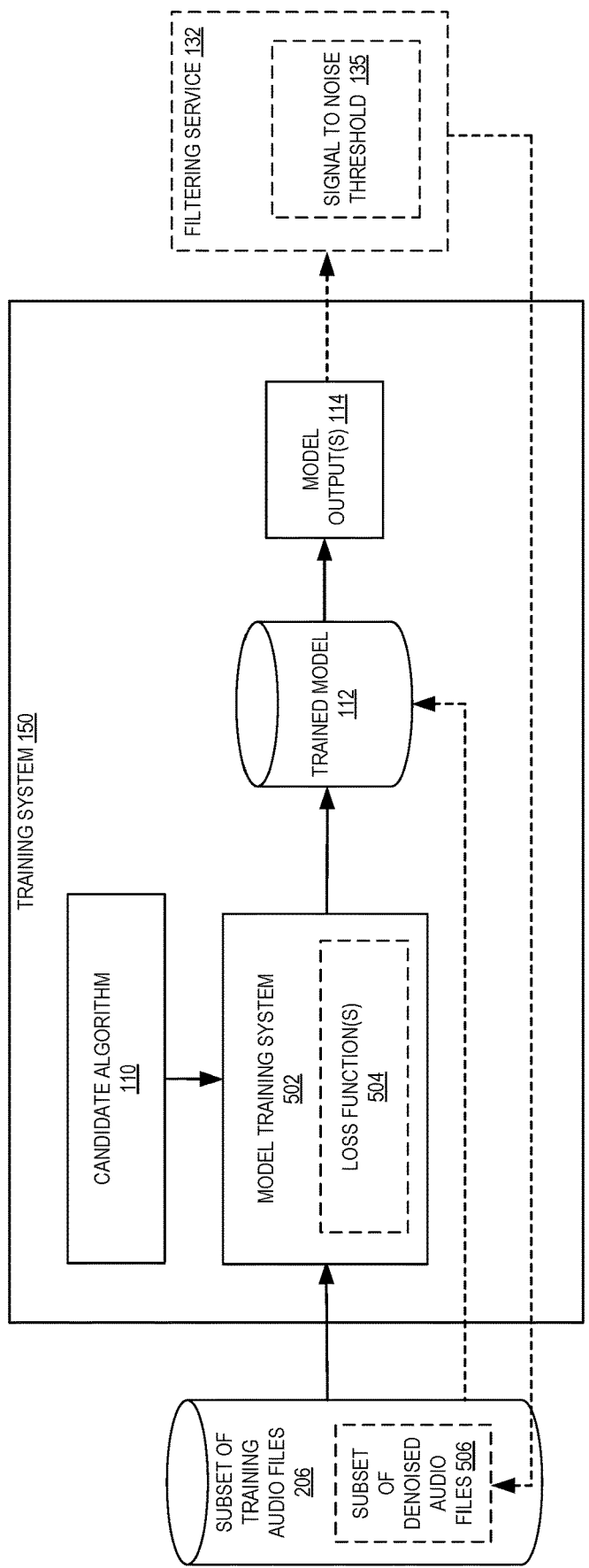
FIG. 5 is a diagram illustrating a training system to train a second model according to some embodiments.

FIG. 5 is a diagram illustrating a training system 150 to train a second model 112 according to some embodiments. Depicted training system 150 includes a model training system 502 to train one or more ML models, for example, to train a ML model to provide model output(s) 114.

In certain embodiments, model training system 502 trains candidate algorithm 110 (e.g., the same candidate algorithm from FIG. 2) into a trained model 112. In one embodiment, model training system 502 trains the ML model on a training dataset of audio files (e.g., subset of training audio files 206 generated as discussed in reference to FIG. 2) (e.g., with a set of hyperparameters of that ML model), evaluates the performance of that model (e.g., at generating one or more outputs 114) on an evaluation portion of training audio files (e.g., files 206) (e.g., by determining a loss value from loss functions(s) 504), and adjusts the (e.g., hyperparameters of that) model (e.g., to minimize a loss value from loss functions(s) 504) to generate a trained model 112. This may be repeated for various hyperparameters and/or model types (e.g., algorithms). When a (e.g., predetermined) threshold score is exceeded by the score for a certain model, the model training system 502 may send that trained model 112 to be used at inference time. In one embodiment, the trained model 112 (e.g., speech enhancement model) is trained to output (e.g., only) a reverberated speech portion (e.g., h*s) and a noise portion (n) of an input audio file. In certain embodiments, the trained model 112 is used to estimate the signal-to-noise ratio (SNR) of each file (e.g., clip) in a set of audio files.

Optionally, filtering service 132 is coupled to model output(s) 114 to perform a filtering based at least in part on the model output(s) 114, e.g., to filter out the file(s) (e.g., clip(s)) that exceed a signal to noise threshold 135. In one embodiment, the model outputs 114 include the reverberated speech portion (e.g., h*s) and a noise portion (n) of an input audio file, e.g., with the filtering service dividing the reverberated speech portion (e.g., h*s) by the noise portion (n) to generate the SNR. In certain embodiments, the SNR is compared to a signal to noise threshold 135, e.g., and those file(s) (e.g., clip(s)) of training audio files 206 that exceed a signal to noise threshold 135 are removed to create a subset of denoised audio files 506. In one embodiment, the signal to noise threshold 135 is about 10 dB. This subset of (e.g., denoised) training audio file(s) 506 may then be used, for example, to perform another training iteration of a candidate algorithm, e.g., to create a different trained model 112 (or update the current trained model 112).

Figure 6:
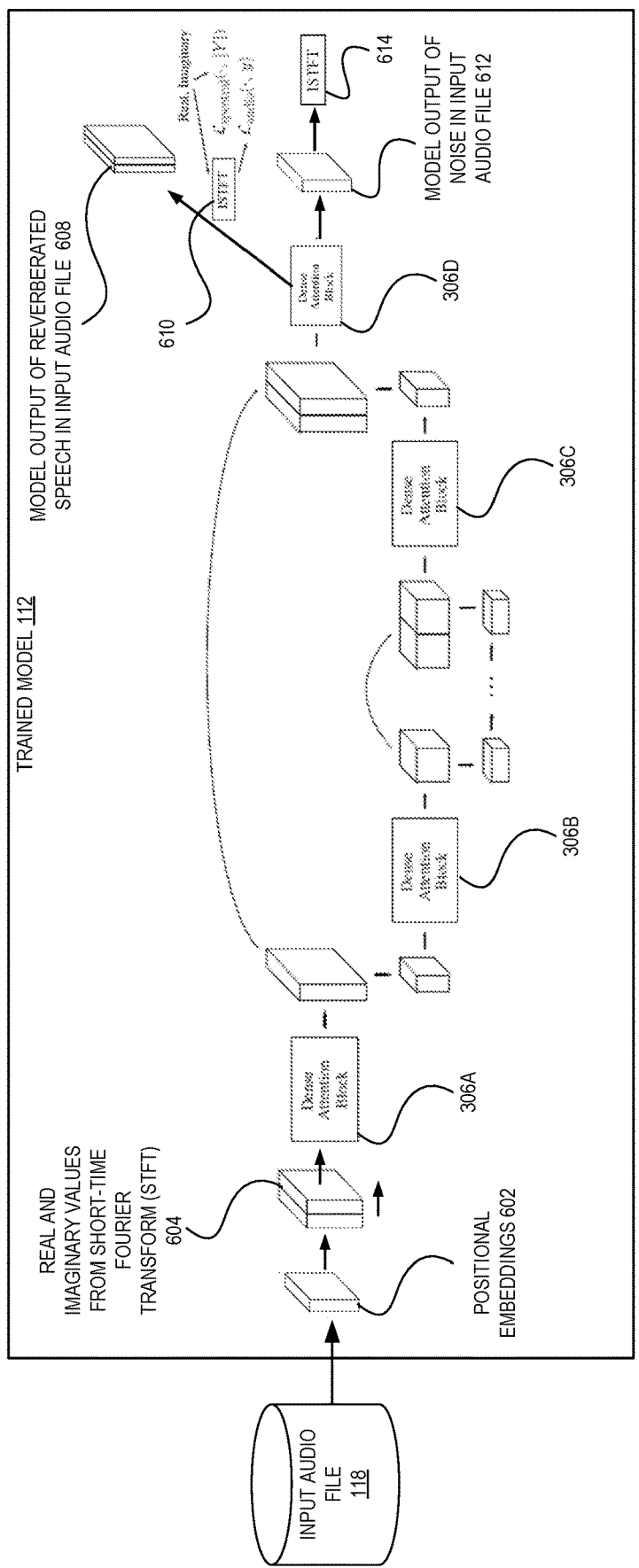
FIG. 6 is a diagram illustrating a model architecture of the second model according to some embodiments.

FIG. 6 is a diagram illustrating a model architecture of the second model 112 according to some embodiments. Depicted model 112 takes as input an audio file 118, and generates one or more model outputs of (i) a reverberated speech portion 608 (e.g., h*s) of the input audio file 118, (ii) a noise portion 612 ($n$) of the input audio file 118, or a combination thereof. In certain embodiments, each output includes its own loss function, for example, a first loss function for reverberated speech portion 608 of the input audio file 118 and a second loss function for noise portion 612 of the input audio file 118.

In one embodiment, for each target y, the loss function (e.g., loss function for reverberated speech portion 608) is:

$$L(y,\hat{y}) = \lambda_{audio} L_{audio}(y,\hat{y}) + \lambda_{spectral} L_{spectral}(Y,\hat{Y}) \quad (2)$$

and the audio loss is the L1 loss:

$$L_{audio}(y,\hat{y}) = |y - \hat{y}| \quad (3)$$

and for the spectral loss function $\mathcal{L}_{spectral}$, let $Y_{t,f}$=absolute value of $\mathrm{STFT}(y)_{t,f}$
and $\hat{Y}_{t,f}$=absolute value of $\mathrm{STFT}(\hat{y})_{t,f}$ be the STFT bin magnitudes and set:

$$\mathcal{L}_{spectral} = \sum_{t,f} w(f)\left(\lambda_{over}\mathbb{1}_{\hat{Y}\geq Y,t,f} + \lambda_{under}\mathbb{1}_{\hat{Y}<Y,t,f}\right)|Y_{t,f} - \hat{Y}_{t,f}| \quad (4)$$

Such that w is a frequency-weighting function, and $$\mathbb{1}_{\hat{Y}\geq Y,t,f} \quad (5)$$

is the characteristic function with value 1 if $\hat{Y}_{t,f} > Y_{t,f}$ and value 0 otherwise. Thus, the variables $\lambda_{over}$ and $\lambda_{under}$ bias the model for overestimation or underestimation of the speech magnitude, respectively.

In certain embodiments, model 112 receives an input audio file 118 (e.g., in audio waveform domain format) and generates positional embeddings 602. The positional embeddings 602 may then be converted from a first format (e.g., waveform domain) to a second format of real and imaginary values (e.g., in time-frequency domain) 604, e.g., from short-time Fourier transform (STFT). The real and real and imaginary values (e.g., in time-frequency domain) 604 may then be input into a first dense attention block 306A (e.g., as discussed further in reference to FIG. 4 below), through one or more additional layers of the model 112, and through second dense attention block 306B, third dense attention block 306C, and fourth dense attention block 306D. In one embodiment, input audio file 118 is a single audio clip, e.g., having a duration of about ten seconds.

Although four dense attention blocks are depicted any single or plurality of dense attention blocks may be utilized in certain embodiments. In certain embodiments, straight arrows in model 112 depict convolutions (e.g., with batch normalization and rectified linear activation unit (ReLU) non-linearity) and curved arrows in model 112 depict concatenations. In one embodiment, a rectified linear activation function returns the value provided as input directly if the input is greater than zero, or the value zero if the input is zero or less.

In certain embodiments, depicted model 112 generates one or more model outputs of (i) a reverberated speech portion 608 (e.g., h*s) of the input audio file 118, (ii) a noise portion 612 (n) of the input audio file 118, or a combination thereof, and further converts them from a second format (e.g., real and imaginary values in time-frequency domain) to a first format (e.g., waveform domain), e.g., via an inverse transform (e.g., ISTFT) 610 and 614, respectively.

In certain embodiments, the architecture of neural model $\mathcal{N}$ 112 includes fully-convolutional two dimensional (e.g., U-Net) architecture with self-attention layers and four layer dense attention blocks 306A-D at each level. In one embodiment, the convolutions are causal in the time direction, but not in the frequency direction, e.g., such that padding is applied symmetrically in the frequency direction, but applied asymmetrically in the time direction (e.g., in the sense that it is only used at the edge of each layer corresponding to the early part in time). In one embodiment, this helps preserve the output quality at the late portion of the output which is used in low-latency application as padding tends to hurt quality near edges and borders. In certain embodiments, look-ahead is provided by the average-pooling layers, which are used instead of max-pooling.

Figure 7:
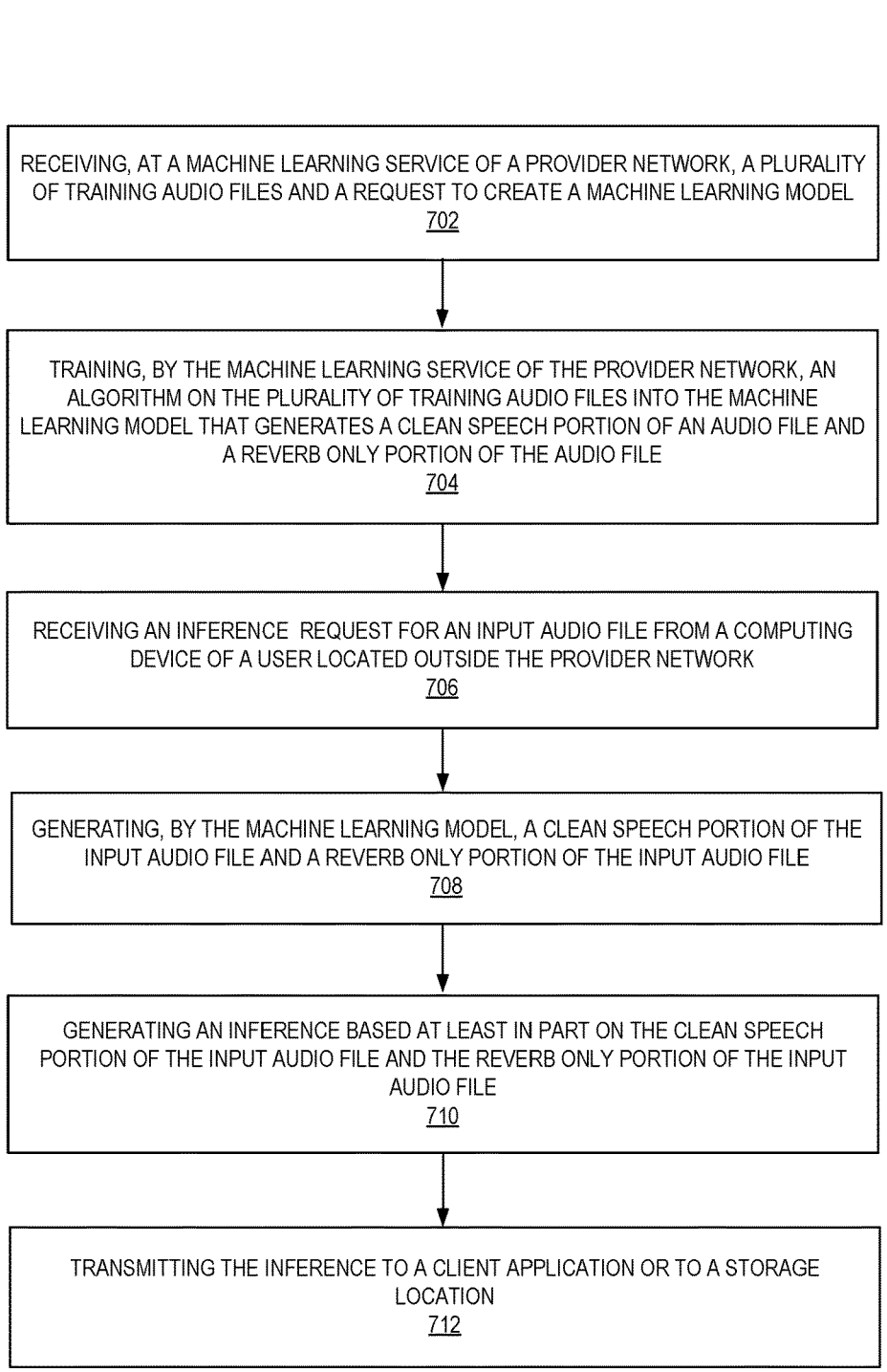
FIG. 7 is a flow diagram illustrating operations of a method for training a machine learning model and performing an inference with the machine learning model according to some embodiments.

FIG. 7 is a flow diagram illustrating operations 700 of a method for training a machine learning model and performing an inference with the machine learning model according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by machine learning service 130 (e.g., implemented in a provider network) of the other figures.

The operations 700 include, at block 702, receiving, at a machine learning service of a provider network, a plurality of training audio files and a request to create a machine learning model. The operations 700 further include, at block 704, training, by the machine learning service of the provider network, an algorithm on the plurality of training audio files into the machine learning model that generates a clean speech portion of an audio file and a reverb only portion of the audio file. The operations 700 further include, at block 706, receiving an inference request for an input audio file from a computing device of a user located outside the provider network. The operations 700 further include, at block 708, generating, by the machine learning model, a clean speech portion of the input audio file and a reverb only portion of the input audio file. The operations 700 further include, at block 710, generating an inference based at least in part on the clean speech portion of the input audio file and the reverb only portion of the input audio file. The operations 700 further include, at block 712, transmitting the inference to a client application or to a storage location. The inference may include, but is not limited to, deleting a file from a plurality of audio files, muting a microphone, or cleaning-up (e.g., removing) background noise and/or reverberation in an audio call.

Figure 8:
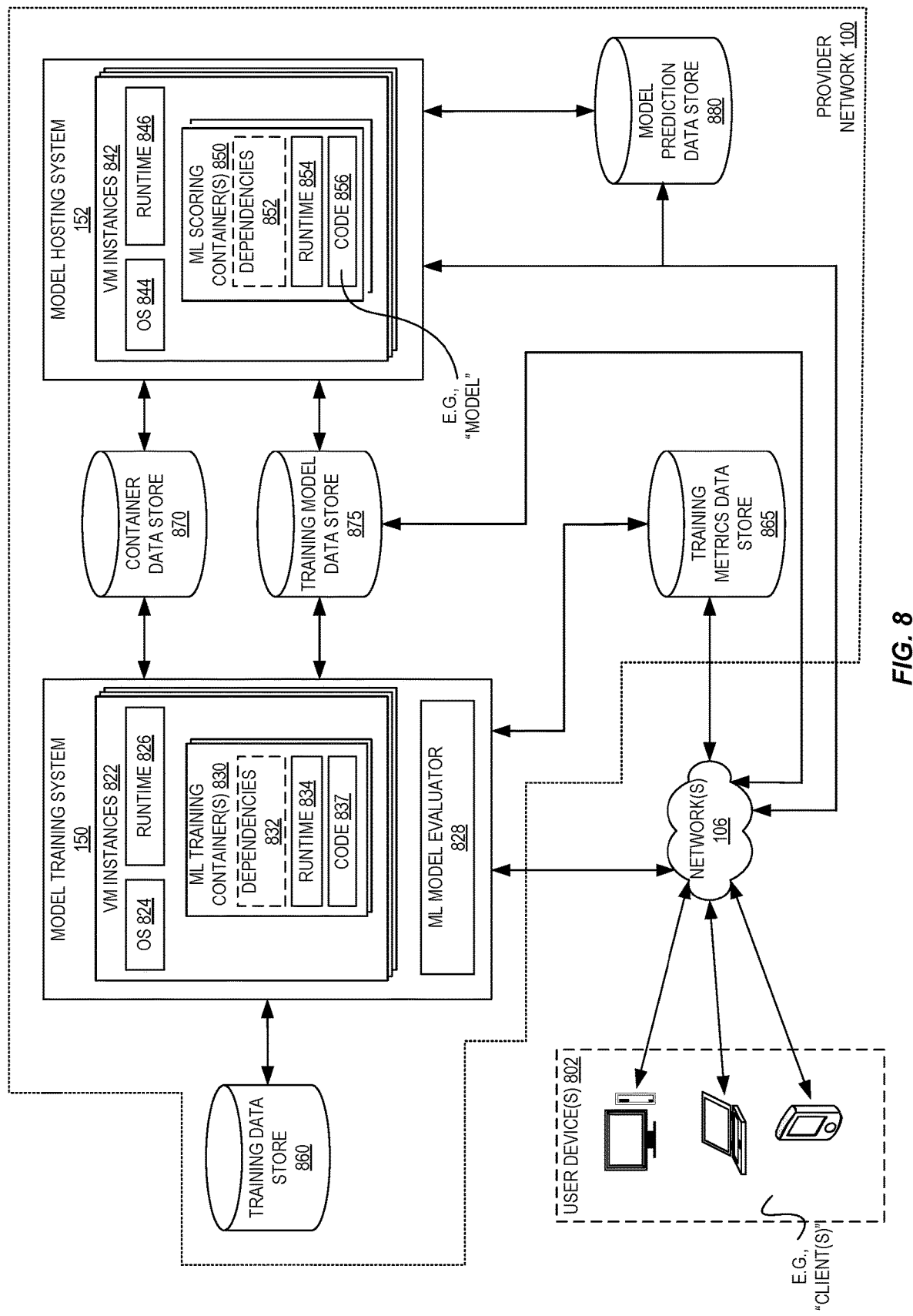
FIG. 8 is a block diagram of an illustrative operating environment in which machine learning models are trained and hosted according to some embodiments.

FIG. 8 is a block diagram of an illustrative operating environment in which machine learning models are trained and hosted according to some embodiments. The operating environment includes end user devices 802 (for example, computing devices 104, computing device 107), a model training system 150, a model hosting system 152, a training data store 860, a training metrics data store 865, a container data store 870, a training model data store 875, and a model prediction data store 880.

A machine learning service 130 described herein may include one or more of these components, such as the model hosting system 152, model training system 150, and so forth.

In some embodiments, users, by way of user devices 802, interact with the model training system 150 to provide data that causes the model training system 150 to train one or more machine learning models, for example, as described elsewhere herein. A machine learning model, generally, may be thought of as one or more equations that are "trained" using a set of data. In some embodiments, the model training system 150 provides ML functionalities as a web service, and thus messaging between user devices 802 and the model training system 150 (or provider network 100), and/or between components of the model training system 150 (or provider network 100), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 802 can interact with the model training system 150 via frontend of the model training system 150. For example, a user device 802 can provide a training request to the frontend that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device 802, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device 802 may provide, in the training request, an algorithm written in any programming language. The model training system 150 then packages the algorithm into a container (optionally with other code, such as a "base" ML algorithm supplemented with user-provided code) that is eventually loaded into a virtual machine instance 822 for training a machine learning model, as described in greater detail below. For example, a user, via a user device 802, may develop an algorithm/code using an application (for example, an interactive web-based programming environment) and cause the algorithm/code to be provided—perhaps as part of a training request (or referenced in a training request)—to the model training system 150, where this algorithm/code may be containerized on its own or used together with an existing container having a machine learning framework, for example.

In some embodiments, instead of providing a container image in the training request, the user device 802 provides, in the training request, an indicator of a container image (for example, an indication of an address or a location at which a container image is stored). For example, the container image can be stored in a container data store 870, and this container image may have been previously created/uploaded by the user. The model training system 150 can retrieve the container image from the indicated location and create a container using the retrieved container image. The container is then loaded into a virtual machine instance 822 for training a machine learning model, as described in greater detail below.

The model training system 150 can use the information provided by the user device 802 to train a machine learning model in one or more pre-established virtual machine instances 822 in some embodiments. In particular, the model training system 150 includes a single physical computing device or multiple physical computing devices that are interconnected using one or more computing networks (not shown), where the physical computing device(s) host one or more virtual machine instances 822. The model training system 150 can handle the acquisition and configuration of compute capacity (for example, containers, instances, etc., which are described in greater detail below) based on the information describing the computing machine on which to train a machine learning model provided by the user device 802. The model training system 150 can then train machine learning models using the compute capacity, as is described in greater detail below. The model training system 150 can automatically scale up and down based on the volume of training requests received from user devices 802 via frontend, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 822 are utilized to execute tasks. For example, such tasks can include training a machine learning model. As shown in FIG. 8, each virtual machine instance 822 includes an operating system (OS) 824, a language runtime 826, and one or more ML training containers 830. Generally, the ML training containers 830 are logical units created within a virtual machine instance using the resources available on that instance and can be utilized to isolate execution of a task from other processes (for example, task executions) occurring in the instance. In some embodiments, the ML training containers 830 are formed from one or more container images and a top container layer. Each container image may further include one or more image layers, where each image layer represents an executable instruction. As described above, some or all of the executable instructions together represent an algorithm that defines a machine learning model. Changes made to the ML training containers 830 (for example, creation of new files, modification of existing files, deletion of files, etc.) are stored in the top container layer. If a ML training container 830 is deleted, the top container layer is also deleted. However, the container image(s) that form a portion of the deleted ML training container 830 can remain unchanged. The ML training containers 830 can be implemented, for example, as Linux containers (LXC), Docker containers, and the like.

The ML training containers 830 may include individual a runtime 834, code 837, and dependencies 832 needed by the code 837 in some embodiments. The runtime 834 can be defined by one or more executable instructions that form at least a portion of a container image that is used to form the ML training container 830 (for example, the executable instruction(s) in the container image that define the operating system and/or runtime to run in the container formed from the container image). The code 837 includes one or more executable instructions that form at least a portion of a container image that is used to form the ML training container 830. For example, the code 837 includes the executable instructions in the container image that represent an algorithm that defines a machine learning model, which may reference (or utilize) code or libraries from dependencies 832. The runtime 834 is configured to execute the code 837 in response to an instruction to begin machine learning model training. Execution of the code 837 results in the generation of model data, as described in greater detail below.

In some embodiments, the code 837 includes executable instructions that represent algorithms that define different machine learning models. For example, the code 837 includes one set of executable instructions that represent a first algorithm that defines a first machine learning model and a second set of executable instructions that represent a second algorithm that defines a second machine learning model. In some embodiments, the virtual machine instance 822 executes the code 837 and trains all of the machine learning models. In some embodiments, the virtual machine instance 822 executes the code 837, selecting one of the machine learning models to train. For example, the virtual machine instance 822 can identify a type of training data indicated by the training request and select a machine learning model to train (for example, execute the executable instructions that represent an algorithm that defines the selected machine learning model) that corresponds with the identified type of training data.

In some embodiments, the runtime 834 is the same as the runtime 826 utilized by the virtual machine instance 822. In some embodiments, the runtime 834 is different than the runtime 826 utilized by the virtual machine instance 822.

In some embodiments, the model training system 150 uses one or more container images included in a training request (or a container image retrieved from the container data store 870 in response to a received training request) to create and initialize a ML training container 830 in a virtual machine instance 822. For example, the model training system 150 creates a ML training container 830 that includes the container image(s) and/or a top container layer.

Prior to beginning the training process, in some embodiments, the model training system 150 retrieves training data from the location indicated in the training request. For example, the location indicated in the training request can be a location in the training data store 860. Thus, the model training system 150 retrieves the training data from the indicated location in the training data store 860. In some embodiments, the model training system 150 does not retrieve the training data prior to beginning the training process. Rather, the model training system 150 streams the training data from the indicated location during the training process. For example, the model training system 150 can initially retrieve a portion of the training data and provide the retrieved portion to the virtual machine instance 822 training the machine learning model. Once the virtual machine instance 822 has applied and used the retrieved portion or once the virtual machine instance 822 is about to use all of the retrieved portion (for example, a buffer storing the retrieved portion is nearly empty), then the model training system 150 can retrieve a second portion of the training data and provide the second retrieved portion to the virtual machine instance 822, and so on.

To perform the machine learning model training, the virtual machine instance 822 executes code 837 stored in the ML training container 830 in some embodiments. For example, the code 837 includes some or all of the executable instructions that form the container image of the ML training container 830 initialized therein. Thus, the virtual machine instance 822 executes some or all of the executable instructions that form the container image of the ML training container 830 initialized therein to train a machine learning model. The virtual machine instance 822 executes some or all of the executable instructions according to the hyperparameter values included in the training request. As an illustrative example, the virtual machine instance 822 trains a machine learning model by identifying values for certain parameters (for example, coefficients, weights, centroids, etc.). The identified values depend on hyperparameters that define how the training is performed. Thus, the virtual machine instance 822 can execute the executable instructions to initiate a machine learning model training process, where the training process is run using the hyperparameter values included in the training request. Execution of the executable instructions can include the virtual machine instance 822 applying the training data retrieved by the model training system 150 as input parameters to some or all of the instructions being executed.

In some embodiments, executing the executable instructions causes the virtual machine instance 822 (for example, the ML training container 830) to generate model data. For example, the ML training container 830 generates model data and stores the model data in a file system of the ML training container 830. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 830 such that the model data is written to the top container layer of the ML training container 830 and/or the container image(s) that forms a portion of the ML training container 830 is modified to include the model data.

The virtual machine instance 822 (or the model training system 150 itself) pulls the generated model data from the ML training container 830 and stores the generated model data in the training model data store 875 in an entry associated with the virtual machine instance 822 and/or the machine learning model being trained. In some embodiments, the virtual machine instance 822 generates a single file that includes model data and stores the single file in the training model data store 875. In some embodiments, the virtual machine instance 822 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 822 can package the multiple files into a single file once training is complete and store the single file in the training model data store 875. Alternatively, the virtual machine instance 822 stores the multiple files in the training model data store 875. The virtual machine instance 822 stores the file(s) in the training model data store 875 while the training process is ongoing and/or after the training process is complete.

In some embodiments, the virtual machine instance 822 regularly stores model data file(s) in the training model data store 875 as the training process is ongoing. Thus, model data file(s) can be stored in the training model data store 875 at different times during the training process. Each set of model data files corresponding to a particular time or each set of model data files present in the training model data store 875 as of a particular time could be checkpoints that represent different versions of a partially-trained machine learning model during different stages of the training process. Accordingly, before training is complete, a user, via the user device 802 can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 875.

In some embodiments, a virtual machine instance 822 executes code 837 stored in a plurality of ML training containers 830. For example, the algorithm included in the container image can be in a format that allows for the parallelization of the training process. Thus, the model training system 150 can create multiple copies of the container image provided in a training request and cause the virtual machine instance 822 to load each container image copy in a separate ML training container 830. The virtual machine instance 822 can then execute, in parallel, the code 837 stored in the ML training containers 830. The virtual machine instance 822 can further provide configuration information to each ML training container 830 (for example, information indicating that N ML training containers 830 are collectively training a machine learning model and that a particular ML training container 830 receiving the configuration information is ML training container 830 number X of N), which can be included in the resulting model data. By parallelizing the training process, the model training system 150 can significantly reduce the training time in some embodiments.

In some embodiments, a plurality of virtual machine instances 822 execute code 837 stored in a plurality of ML training containers 830. For example, the resources used to train a particular machine learning model can exceed the limitations of a single virtual machine instance 822. However, the algorithm included in the container image can be in a format that allows for the parallelization of the training process. Thus, the model training system 150 can create multiple copies of the container image provided in a training request, initialize multiple virtual machine instances 822, and cause each virtual machine instance 822 to load a container image copy in one or more separate ML training containers 830. The virtual machine instances 822 can then each execute the code 837 stored in the ML training containers 830 in parallel. The model training system 150 can further provide configuration information to each ML training container 830 via the virtual machine instances 822 (for example, information indicating that N ML training containers 830 are collectively training a machine learning model and that a particular ML training container 830 receiving the configuration information is ML training container 830 number X of N, information indicating that M virtual machine instances 822 are collectively training a machine learning model and that a particular ML training container 830 receiving the configuration information is initialized in virtual machine instance 822 number Y of M, etc.), which can be included in the resulting model data. As described above, by parallelizing the training process, the model training system 150 can significantly reduce the training time in some embodiments.

In some embodiments, the model training system 150 includes a plurality of physical computing devices and two or more of the physical computing devices hosts one or more virtual machine instances 822 that execute the code 837. Thus, the parallelization can occur over different physical computing devices in addition to over different virtual machine instances 822 and/or ML training containers 830.

In some embodiments, the model training system 150 includes a ML model evaluator 828. The ML model evaluator 828 can monitor virtual machine instances 822 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 828 can obtain the model data for a machine learning model being trained and evaluation data from the training data store 860. The evaluation data is separate from the data used to train a machine learning model and includes both input data and expected outputs (for example, known results), and thus the ML model evaluator 828 can define a machine learning model using the model data and execute the machine learning model by providing the input data as inputs to the machine learning model. The ML model evaluator 828 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 828 periodically generates model metrics during the training process and stores the model metrics in the training metrics data store 865 in some embodiments. While the machine learning model is being trained, a user, via the user device 802, can access and retrieve the model metrics from the training metrics data store 865. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device 802, can transmit a request to the model training system 150 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 150 can modify the machine learning model accordingly. For example, the model training system 150 can cause the virtual machine instance 822 to optionally delete an existing ML training container 830, create and initialize a new ML training container 830 using some or all of the information included in the request, and execute the code 837 stored in the new ML training container 830 to restart the machine learning model training process. As another example, the model training system 150 can cause the virtual machine instance 822 to modify the execution of code stored in an existing ML training container 830 according to the data provided in the modification request. In some embodiments, the user, via the user device 802, can transmit a request to the model training system 150 to stop the machine learning model training process. The model training system 150 can then instruct the virtual machine instance 822 to delete the ML training container 830 and/or to delete any model data stored in the training model data store 875.

As described below, in some embodiments, the model data stored in the training model data store 875 is used by the model hosting system 152 to deploy machine learning models. Alternatively or additionally, a user device 802 or another computing device (not shown) can retrieve the model data from the training model data store 875 to implement a learning algorithm in an external device. As an illustrative example, a robotic device can include sensors to capture input data. A user device 802 can retrieve the model data from the training model data store 875 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 822 are shown in FIG. 8 as a single grouping of virtual machine instances 822, some embodiments of the present application separate virtual machine instances 822 that are actively assigned to execute tasks from those virtual machine instances 822 that are not actively assigned to execute tasks. For example, those virtual machine instances 822 actively assigned to execute tasks are grouped into an "active pool," while those virtual machine instances 822 not actively assigned to execute tasks are placed within a "warming pool." In some embodiments, those virtual machine instances 822 within the warming pool can be pre-initialized with an operating system, language runtimes, and/or other software required to enable rapid execution of tasks (for example, rapid initialization of machine learning model training in ML training container(s) 830) in response to training requests.

In some embodiments, the model training system 150 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 802, the model hosting system 152, etc.). The processing unit can also communicate to and from a memory of a virtual machine instance 822 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 152 includes a single physical computing device or multiple physical computing devices that are interconnected using one or more computing networks (not shown), where the physical computing device(s) host one or more virtual machine instances 842. The model hosting system 152 can handle the acquisition and configuration of compute capacity (for example, containers, instances, etc.) based on demand for the execution of trained machine learning models. The model hosting system 152 can then execute machine learning models using the compute capacity, as is described in greater detail below. The model hosting system 152 can automatically scale up and down based on the volume of execution requests received from user devices 802 via frontend of the model hosting system 152, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some embodiments, the virtual machine instances 842 are utilized to execute tasks. For example, such tasks can include executing a machine learning model. As shown in FIG. 8, each virtual machine instance 842 includes an operating system (OS) 844, a language runtime 846, and one or more ML scoring containers 850. The ML scoring containers 850 are similar to the ML training containers 830 in that the ML scoring containers 850 are logical units created within a virtual machine instance using the resources available on that instance and can be utilized to isolate execution of a task from other processes (for example, task executions) occurring in the instance. In some embodiments, the ML scoring containers 850 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 850 (for example, creation of new files, modification of existing files, deletion of files, etc.) are stored in the top container layer. If a ML scoring container 850 is deleted, the top container layer is also deleted. However, the container image(s) that form a portion of the deleted ML scoring container 850 can remain unchanged. The ML scoring containers 850 can be implemented, for example, as Linux containers.

The ML scoring containers 850 each include a runtime 854, code 856, and dependencies 852 (for example, supporting software such as libraries) needed by the code 856 in some embodiments. The runtime 854 can be defined by one or more executable instructions that form at least a portion of a container image that is used to form the ML scoring container 850 (for example, the executable instruction(s) in the container image that define the operating system and/or runtime to run in the container formed from the container image). The code 856 includes one or more executable instructions that form at least a portion of a container image that is used to form the ML scoring container 850. For example, the code 856 includes the executable instructions in the container image that represent an algorithm that defines a machine learning model, which may reference dependencies 852. The code 856 can also include model data that represent characteristics of the defined machine learning model, as described in greater detail below. The runtime 854 is configured to execute the code 856 in response to an instruction to begin execution of a machine learning model. Execution of the code 856 results in the generation of outputs (for example, predicted results), as described in greater detail below.

In some embodiments, the runtime 854 is the same as the runtime 846 utilized by the virtual machine instance 842. In some embodiments, runtime 854 is different than the runtime 846 utilized by the virtual machine instance 842.

In some embodiments, the model hosting system 152 uses one or more container images included in a deployment request (or a container image retrieved from the container data store 870 in response to a received deployment request) to create and initialize a ML scoring container 850 in a virtual machine instance 842. For example, the model hosting system 152 creates a ML scoring container 850 that includes the container image(s) and/or a top container layer.

As described above, a user device 802 can submit a deployment request and/or an execution request to the model hosting system 152 via the frontend in some embodiments. A deployment request causes the model hosting system 152 to deploy a trained machine learning model into a virtual machine instance 842. For example, the deployment request can include an identification of an endpoint (for example, an endpoint name, such as an HTTP endpoint name) and an identification of one or more trained machine learning models (for example, a location of one or more model data files stored in the training model data store 875). Optionally, the deployment request also includes an identification of one or more container images stored in the container data store 870.

Upon receiving the deployment request, the model hosting system 152 initializes ones or more ML scoring containers 850 in one or more hosted virtual machine instance 842. In embodiments in which the deployment request includes an identification of one or more container images, the model hosting system 152 forms the ML scoring container(s) 850 from the identified container image(s). For example, a container image identified in a deployment request can be the same container image used to form an ML training container 830 used to train the machine learning model corresponding to the deployment request. Thus, the code 856 of the ML scoring container(s) 850 includes one or more executable instructions in the container image(s) that represent an algorithm that defines a machine learning model. In embodiments in which the deployment request does not include an identification of a container image, the model hosting system 152 forms the ML scoring container(s) 850 from one or more container images stored in the container data store 870 that are appropriate for executing the identified trained machine learning model(s). For example, an appropriate container image can be a container image that includes executable instructions that represent an algorithm that defines the identified trained machine learning model(s).

The model hosting system 152 further forms the ML scoring container(s) 850 by retrieving model data corresponding to the identified trained machine learning model(s) in some embodiments. For example, the deployment request can identify a location of model data file(s) stored in the training model data store 875. In embodiments in which a single model data file is identified in the deployment request, the model hosting system 152 retrieves the identified model data file from the training model data store 875 and inserts the model data file into a single ML scoring container 850, which forms a portion of code 856. In some embodiments, the model data file is archived or compressed (for example, formed from a package of individual files). Thus, the model hosting system 152 unarchives or decompresses the model data file to obtain multiple individual files and inserts the individual files into the ML scoring container 850. In some embodiments, the model hosting system 152 stores the model data file in the same location as the location in which the model data file was stored in the ML training container 830 that generated the model data file. For example, the model data file initially was stored in the top container layer of the ML training container 830 at a certain offset, and the model hosting system 152 then stores the model data file in the top container layer of the ML scoring container 850 at the same offset.

In embodiments in which multiple model data files are identified in the deployment request, the model hosting system 152 retrieves the identified model data files from the training model data store 875. The model hosting system 152 can insert the model data files into the same ML scoring container 850, into different ML scoring containers 850 initialized in the same virtual machine instance 842, or into different ML scoring containers 850 initialized in different virtual machine instances 842. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 152 associates the initialized ML scoring container(s) 850 with the endpoint identified in the deployment request. For example, each of the initialized ML scoring container(s) 850 can be associated with a network address. The model hosting system 152 can map the network address(es) to the identified endpoint, and the model hosting system 152 or another system (for example, a routing system, not shown) can store the mapping. Thus, a user device 802 can refer to trained machine learning model(s) stored in the ML scoring container(s) 850 using the endpoint. This allows for the network address of an ML scoring container 850 to change without causing the user operating the user device 802 to change the way in which the user refers to a trained machine learning model.

Once the ML scoring container(s) 850 are initialized, the ML scoring container(s) 850 are ready to execute trained machine learning model(s). In some embodiments, the user device 802 transmits an execution request to the model hosting system 152 via the frontend, where the execution request identifies an endpoint and includes an input to a machine learning model (for example, a set of input data). The model hosting system 152 or another system (for example, a routing system, not shown) can obtain the execution request, identify the ML scoring container(s) 850 corresponding to the identified endpoint, and route the input to the identified ML scoring container(s) 850.

In some embodiments, a virtual machine instance 842 executes the code 856 stored in an identified ML scoring container 850 in response to the model hosting system 152 receiving the execution request. In particular, execution of the code 856 causes the executable instructions in the code 856 corresponding to the algorithm to read the model data file stored in the ML scoring container 850, use the input included in the execution request as an input parameter, and generate a corresponding output. As an illustrative example, the algorithm can include coefficients, weights, layers, cluster centroids, and/or the like. The executable instructions in the code 856 corresponding to the algorithm can read the model data file to determine values for the coefficients, weights, layers, cluster centroids, and/or the like. The executable instructions can include input parameters, and the input included in the execution request can be supplied by the virtual machine instance 842 as the input parameters. With the machine learning model characteristics and the input parameters provided, execution of the executable instructions by the virtual machine instance 842 can be completed, resulting in an output.

In some embodiments, the virtual machine instance 842 stores the output in the model prediction data store 880. Alternatively or in addition, the virtual machine instance 842 transmits the output to the user device 802 that submitted the execution result via the frontend.

In some embodiments, the execution request corresponds to a group of related trained machine learning models. Thus, the ML scoring container 850 can transmit the output to a second ML scoring container 850 initialized in the same virtual machine instance 842 or in a different virtual machine instance 842. The virtual machine instance 842 that initialized the second ML scoring container 850 can then execute second code 856 stored in the second ML scoring container 850, providing the received output as an input parameter to the executable instructions in the second code 856. The second ML scoring container 850 further includes a model data file stored therein, which is read by the executable instructions in the second code 856 to determine values for the characteristics defining the machine learning model. Execution of the second code 856 results in a second output. The virtual machine instance 842 that initialized the second ML scoring container 850 can then transmit the second output to the model prediction data store 880 and/or the user device 802 via the frontend (for example, if no more trained machine learning models are needed to generate an output) or transmit the second output to a third ML scoring container 850 initialized in the same or different virtual machine instance 842 (for example, if outputs from one or more additional trained machine learning models are needed), and the above-referenced process can be repeated with respect to the third ML scoring container 850.

While the virtual machine instances 842 are shown in FIG. 8 as a single grouping of virtual machine instances 842, some embodiments of the present application separate virtual machine instances 842 that are actively assigned to execute tasks from those virtual machine instances 842 that are not actively assigned to execute tasks. For example, those virtual machine instances 842 actively assigned to execute tasks are grouped into an "active pool," while those virtual machine instances 842 not actively assigned to execute tasks are placed within a "warming pool." In some embodiments, those virtual machine instances 842 within the warming pool can be pre-initialized with an operating system, language runtimes, and/or other software required to enable rapid execution of tasks (for example, rapid initialization of ML scoring container(s) 850, rapid execution of code 856 in ML scoring container(s), etc.) in response to deployment and/or execution requests.

In some embodiments, the model hosting system 152 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 802, the model training system 150, etc.). The processing unit can also communicate to and from a memory of a virtual machine instance 842 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 150 and the model hosting system 152 depicted in FIG. 8 are not meant to be limiting. For example, the model training system 150 and/or the model hosting system 152 could also operate within a computing environment having a fewer or greater number of devices than are illustrated in FIG. 8. Thus, the depiction of the model training system 150 and/or the model hosting system 152 in FIG. 8 may be taken as illustrative and not limiting to the present disclosure. For example, the model training system 150 and/or the model hosting system 152 or various constituents thereof could implement various web services components, hosted or "cloud" computing environments, and/or peer-to-peer network configurations to implement at least a portion of the processes described herein. In some embodiments, the model training system 150 and/or the model hosting system 152 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend of model training system 150 processes all training requests received from user devices 802 and provisions virtual machine instances 822. In some embodiments, the frontend serves as a front door to all the other services provided by the model training system 150. The frontend processes the requests and makes sure that the requests are properly authorized. For example, the frontend may determine whether the user associated with the training request is authorized to initiate the training process.

Similarly, frontend for model hosting system 152 processes all deployment and execution requests received from user devices 802 and provisions virtual machine instances 842. In some embodiments, the frontend serves as a front door to all the other services provided by the model hosting system 152. The frontend processes the requests and makes sure that the requests are properly authorized. For example, the frontend may determine whether the user associated with a deployment request or an execution request is authorized to access the indicated model data and/or to execute the indicated machine learning model.

The training data store 860 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 860 is depicted as being located external to the model training system 150 and the model hosting system 152, this is not meant to be limiting. For example, in some embodiments not shown, the training data store 860 is located internal to at least one of the model training system 150 or the model hosting system 152.

In some embodiments, the training metrics data store 865 stores model metrics. While the training metrics data store 865 is depicted as being located external to the model training system 150 and the model hosting system 152, this is not meant to be limiting. For example, in some embodiments not shown, the training metrics data store 865 is located internal to at least one of the model training system 150 or the model hosting system 152.

The container data store 870 stores container images, such as container images used to form ML training containers 830 and/or ML scoring containers 850, that can be retrieved by various virtual machine instances 822 and/or 842. While the container data store 870 is depicted as being located external to the model training system 150 and the model hosting system 152, this is not meant to be limiting. For example, in some embodiments not shown, the container data store 870 is located internal to at least one of the model training system 150 and the model hosting system 152.

The training model data store 875 stores model data files. In some embodiments, some of the model data files are comprised of a single file, while other model data files are packages of multiple individual files. While the training model data store 875 is depicted as being located external to the model training system 150 and the model hosting system 152, this is not meant to be limiting. For example, in some embodiments not shown, the training model data store 875 is located internal to at least one of the model training system 150 or the model hosting system 152.

The model prediction data store 880 stores outputs (for example, execution results) generated by the ML scoring containers 850 in some embodiments. While the model prediction data store 880 is depicted as being located external to the model training system 150 and the model hosting system 152, this is not meant to be limiting. For example, in some embodiments not shown, the model prediction data store 880 is located internal to at least one of the model training system 150 and the model hosting system 152.

While the model training system 150, the model hosting system 152, the training data store 860, the training metrics data store 865, the container data store 870, the training model data store 875, and the model prediction data store 880 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 802 via the one or more network(s) 106.

Various example user devices 802 are shown in FIG. 8, including a desktop computer, laptop, and a mobile phone, each provided by way of illustration. In general, the user devices 802 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 150 and/or the model hosting system 152 provides the user devices 802 with one or more user interfaces, command-line interfaces (CLI), application programming interfaces (API), and/or other programmatic interfaces for submitting training requests, deployment requests, and/or execution requests. In some embodiments, the user devices 802 can execute a stand-alone application that interacts with the model training system 150 and/or the model hosting system 152 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 9:
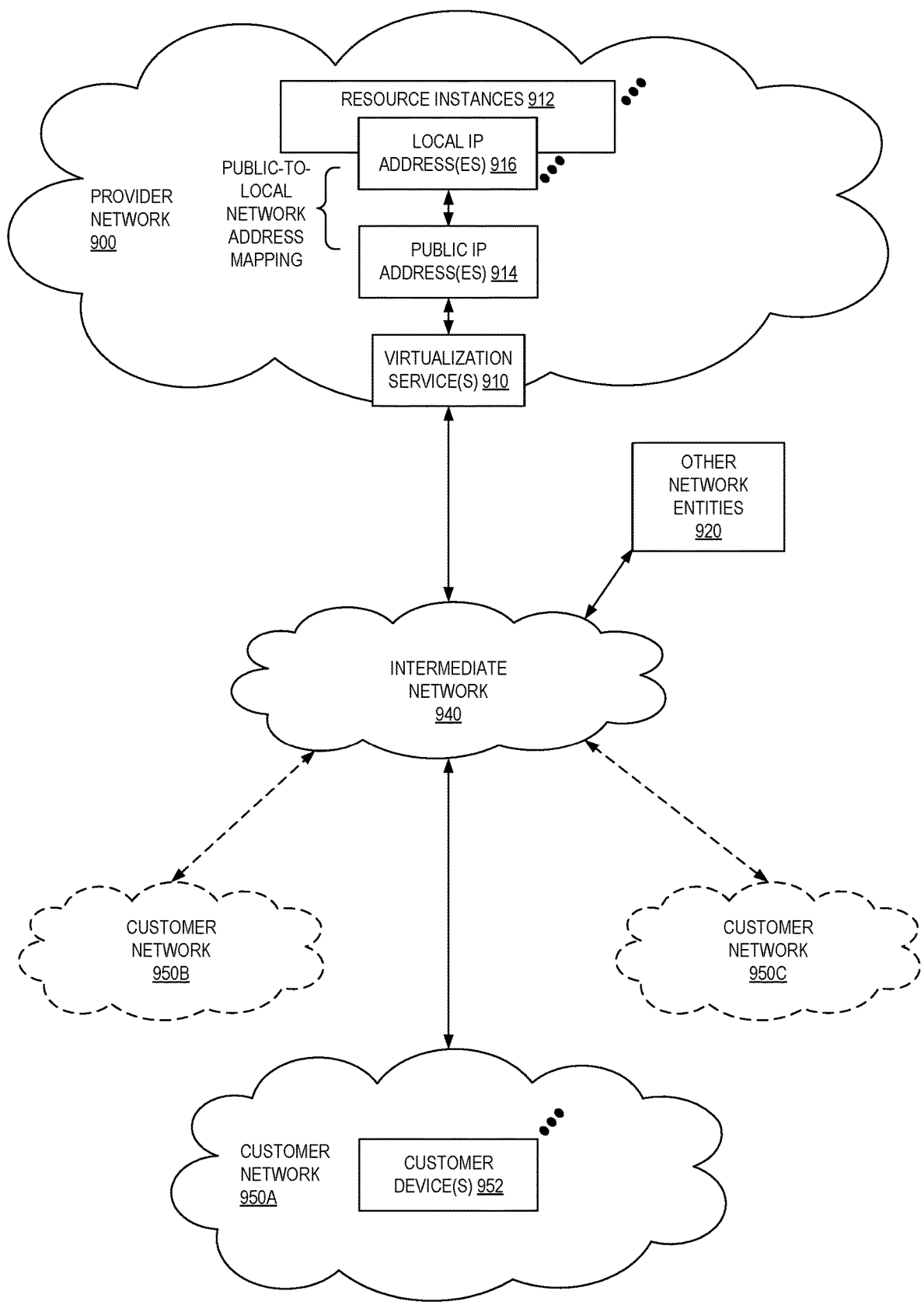
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet.

Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
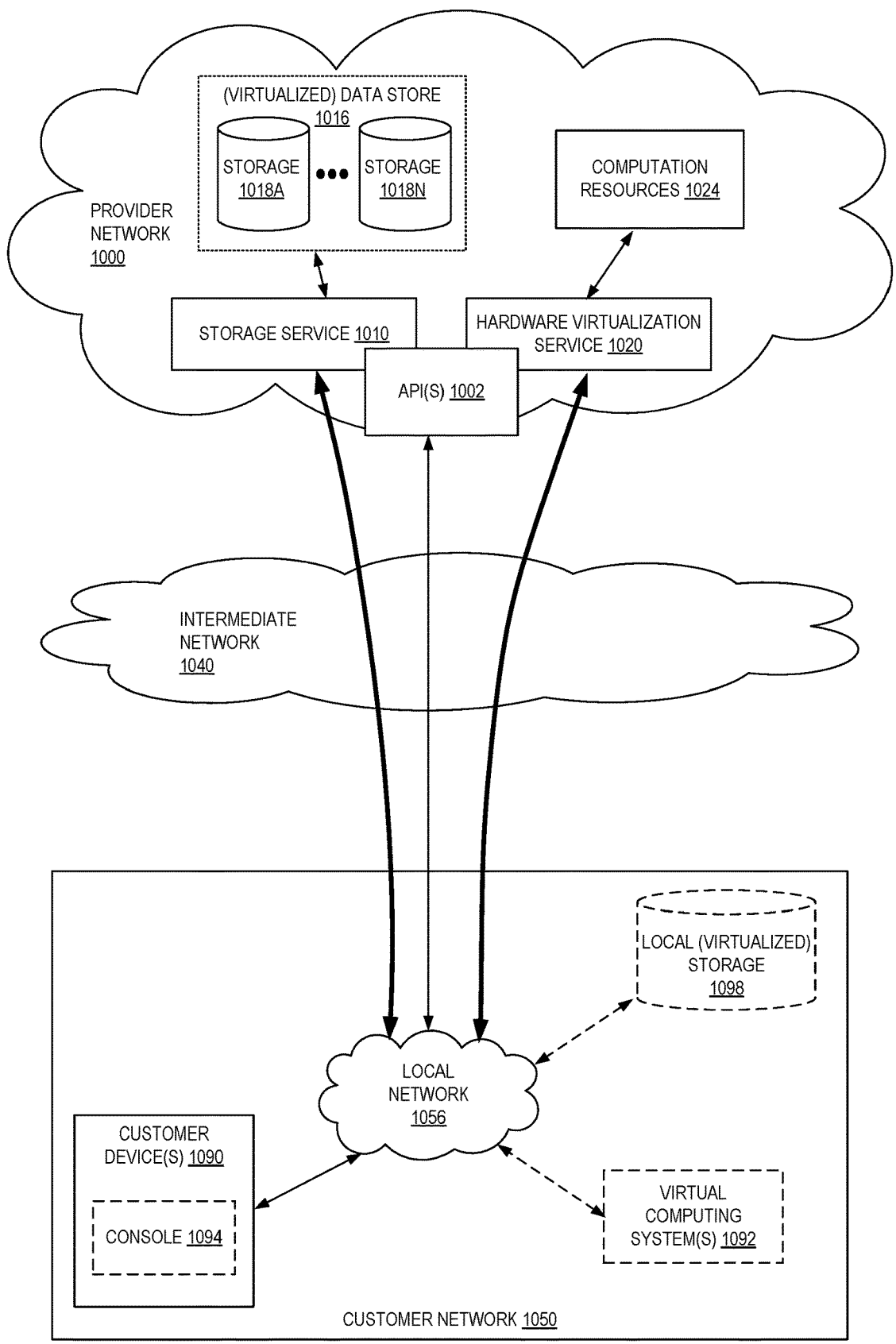
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative Systems

Figure 11:
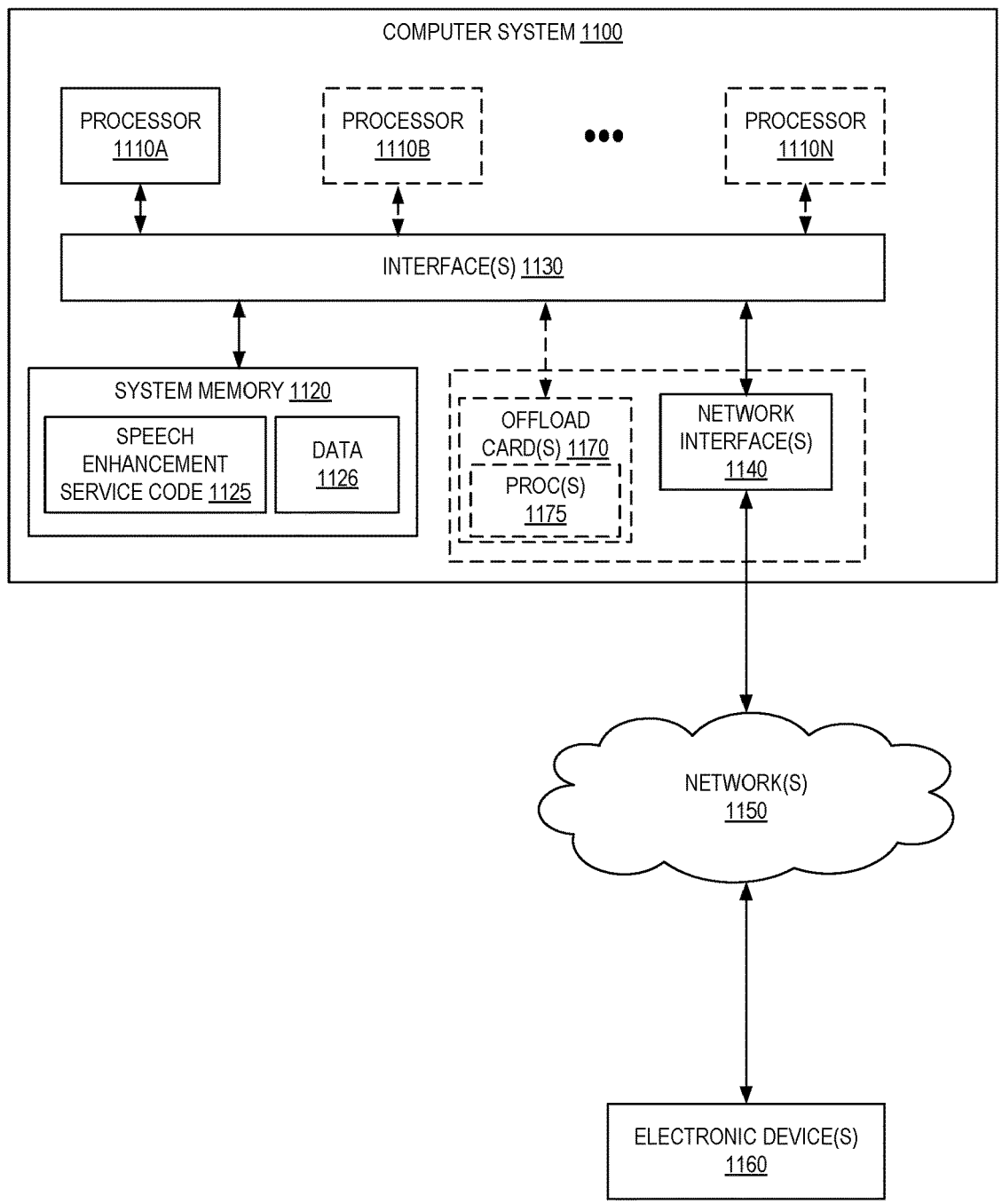
FIG. 11 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as speech enhancement service code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s)

can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C#or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1018A-1018N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, at a machine learning service of a provider network, a plurality of training audio files and a request to create a machine learning model;
training, by the machine learning service of the provider network, an algorithm into the machine learning model that generates a clean speech portion of an audio file and a reverb only portion of the audio file;
generating, by the machine learning model, a reverb only portion and a clean speech portion of at least one of the plurality of training audio files;
determining a direct to reverberant ratio of the at least one of the plurality of training audio files based on the reverb only portion and the clean speech portion of the at least one of the plurality of training audio files;
filtering out the at least one of the plurality of training audio files having the direct to reverberant ratio below a reverberance threshold to generate a proper subset of the plurality of training audio files;
performing a training iteration with the proper subset of the plurality of training audio files to update the machine learning model;
receiving an inference request for an input audio file from a computing device of a user located outside the provider network;
generating, by the machine learning model, a clean speech portion of the input audio file and a reverb only portion of the input audio file;
generating an inference based at least in part on the clean speech portion of the input audio file and the reverb only portion of the input audio file; and
transmitting the inference to a client application or to a storage location.

2. The computer-implemented method of claim 1, wherein the determining compares the reverb only portion to the clean speech portion.

3. The computer-implemented method of claim 1, wherein the training comprises minimizing a first loss function for the clean speech portion of the audio file and minimizing a second loss function for the reverb only portion of the audio file.

4. A computer-implemented method comprising:
receiving a plurality of training audio files and a request to create a machine learning model;
training an algorithm into the machine learning model that generates a reverb portion of an audio file;
generating, by the machine learning model, a reverb portion of at least one of the plurality of training audio files;
determining a direct to reverberant ratio of the at least one of the plurality of training audio files in part from the reverb portion of the at least one of the plurality of training audio files;
filtering out the at least one of the plurality of training audio files having the direct to reverberant ratio below a reverberance threshold to generate a proper subset of the plurality of training audio files;
performing a training iteration with the proper subset of the plurality of training audio files to generate an updated machine learning model;
receiving an inference request for an input audio file;
generating, by the machine learning model, a reverb portion of the input audio file;
generating an inference based at least in part on the reverb portion of the input audio file; and
transmitting the inference to a client application or to a storage location.

5. The computer-implemented method of claim 4, further comprising generating, by the machine learning model, a clean speech portion of the at least one of the plurality of training audio files, wherein the determining compares the reverb portion to the clean speech portion for each of the at least one of the plurality of training audio files.

6. The computer-implemented method of claim 5, wherein the direct to reverberant ratio is a ratio of the clean speech portion to the reverb portion.

7. The computer-implemented method of claim 4, further comprising generating, by the machine learning model, a clean speech portion of the input audio file, wherein the generating the inference is based at least in part on the clean speech portion of the input audio file and the reverb portion of the input audio file.

8. The computer-implemented method of claim 7, wherein the training comprises minimizing a first loss function for the clean speech portion of the audio file and minimizing a second loss function for the reverb portion of the audio file.

9. The computer-implemented method of claim 7, further comprising generating, by the machine learning model, a noise portion of the input audio file, wherein the generating the inference is based at least in part on the clean speech portion of the input audio file, the reverb portion of the input audio file, and the noise portion of the input audio file.

10. The computer-implemented method of claim 4, further comprising generating, by the machine learning model, a noise portion of the input audio file, wherein the generating the inference is based at least in part on the reverb portion of the input audio file and the noise portion of the input audio file.

11. The computer-implemented method of claim 4, further comprising:
converting the input audio file from an audio waveform domain to a time-frequency domain, wherein the generating, by the machine learning model, of the reverb portion of the input audio file is in the time-frequency domain; and
converting the reverb portion of the input audio file in the time-frequency domain to the audio waveform domain.

12. The computer-implemented method of claim 4, further comprising:
training a second algorithm on a second plurality of training audio files into a second machine learning model that generates a reverberated speech portion of an audio file;
receiving a second inference request for a second input audio file;
generating, by the second machine learning model, a reverberated speech portion of the second input audio file;
generating a second inference based at least in part on the reverberated speech portion of the second input audio file; and
transmitting the second inference to a client application or to a storage location.

13. The computer-implemented method of claim 12, further comprising:
generating, by the second machine learning model, a noise portion of the second input audio file; and filtering out at least one of the second plurality of training audio files below a signal to noise threshold for the noise portion to generate a proper subset of the second plurality of training audio files.

14. A system comprising:
a first one or more electronic devices to implement a storage service in a provider network, the storage service to store a plurality of training audio files; and
a second one or more electronic devices to implement a machine learning service in the provider network, the machine learning service including instructions that upon execution cause the machine learning service to perform operations comprising:
receiving a request to create a machine learning model,
training an algorithm into the machine learning model that generates a reverb portion of an audio file,
generating, by the machine learning model, a reverb portion of at least one of the plurality of training audio files,
determining a direct to reverberant ratio of the at least one of the plurality of training audio files in part from the reverb portion of the at least one of the plurality of training audio files,
filtering out the at least one of the plurality of training audio files having the direct to reverberant ratio below a reverberance threshold to generate a proper subset of the plurality of training audio files,
performing a training iteration with the proper subset of the plurality of training audio files to generate an updated machine learning model,
receiving an inference request for an input audio file,
generating, by the machine learning model, a reverb portion of the input audio file,
generating an inference based at least in part on the reverb portion of the input audio file, and
transmitting the inference to a client application or to a storage location.

15. The system of claim 14, wherein the instructions upon execution cause the machine learning service to perform operations further comprising generating, by the machine learning model, a clean speech portion of the input audio file, wherein the generating the inference is based at least in part on the clean speech portion of the input audio file and the reverb portion of the input audio file.

16. The system of claim 15, wherein the training comprises minimizing a first loss function for the clean speech portion of the audio file and minimizing a second loss function for the reverb portion of the audio file.

17. The system of claim 14, wherein the instructions upon execution cause the machine learning service to perform operations further comprising:
converting the input audio file from an audio waveform domain to a time-frequency domain, wherein the generating, by the machine learning model, of the reverb portion of the input audio file is in the time-frequency domain; and
converting the reverb portion of the input audio file in the time-frequency domain to the audio waveform domain.

18. The system of claim 14, wherein the instructions upon execution cause the machine learning service to perform operations further comprising:
training a second algorithm on a second plurality of training audio files into a second machine learning model that generates a reverberated speech portion of an audio file;
receiving a second inference request for a second input audio file;
generating, by the second machine learning model, a reverberated speech portion of the second input audio file;
generating a second inference based at least in part on the reverberated speech portion of the second input audio file; and
transmitting the second inference to a client application or to a storage location.

19. The system of claim 14, wherein the instructions upon execution cause the machine learning service to perform operations further comprising generating, by the machine learning model, a clean speech portion of the at least one of the plurality of training audio files, wherein the determining compares the reverb portion to the clean speech portion for each of the at least one of the plurality of training audio files.

* * * * *